(12) United States Patent
Ishigami et al.

(10) Patent No.: US 10,547,223 B2
(45) Date of Patent: Jan. 28, 2020

(54) STATOR COIL, STATOR, ELECTROMAGNETIC DEVICE, AND METHOD OF MANUFACTURING STATOR COIL

(71) Applicant: Hitachi Automotive Systems, Ltd., Hitachinaka-shi, Ibaraki (JP)

(72) Inventors: Takashi Ishigami, Tokyo (JP); Yuichiro Baba, Hitachinaka (JP); Manabu Oshida, Hitachinaka (JP); Ryoji Kobayashi, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 172 days.

(21) Appl. No.: 15/315,737

(22) PCT Filed: Apr. 30, 2015

(86) PCT No.: PCT/JP2015/062964
§ 371 (c)(1),
(2) Date: Dec. 2, 2016

(87) PCT Pub. No.: WO2016/006310
PCT Pub. Date: Jan. 14, 2016

(65) Prior Publication Data
US 2017/0117767 A1    Apr. 27, 2017

(30) Foreign Application Priority Data
Jul. 8, 2014 (JP) .................................. 2014-140466

(51) Int. Cl.
*H02K 3/12* (2006.01)
*H02K 1/16* (2006.01)
*H02K 15/085* (2006.01)

(52) U.S. Cl.
CPC ................. *H02K 3/12* (2013.01); *H02K 1/16* (2013.01); *H02K 15/085* (2013.01)

(58) Field of Classification Search
CPC .. H02K 3/00; H02K 3/04; H02K 3/14; H02K 3/18; H02K 3/34; H02K 3/345;
(Continued)

(56) References Cited

U.S. PATENT DOCUMENTS 6,555,942 B1 * 4/2003 Hsu ........................ H02K 1/148
310/194
8,056,215 B2 * 11/2011 Takada ............... H02K 15/0478
242/365.3

(Continued)

FOREIGN PATENT DOCUMENTS

| JP | 2008-178199 A | 7/2008 |
|----|---------------|--------|
| JP | 2008-199719 A | 8/2008 |
| JP | 2011-234516 A | 11/2011 |

OTHER PUBLICATIONS

International Search Report of PCT/JP2015/062964 dated Aug. 4, 2015.

*Primary Examiner* — Nguyen Tran
(74) *Attorney, Agent, or Firm* — Mattingly & Malur, PC

(57) ABSTRACT

A stator coil that is wound by concentrated winding and installed in a slot of a stator includes a winding part in which a conductor is wound pitch by pitch around a tooth of the stator and connection terminals which extend from both ends of the winding part. The winding part includes a plurality of unit winding subparts of a rectangular annular shape, a unit winding subpart including a pair of first straight-line segments, a pair of second straight-line segments, and curved corner segments which join the first straight-line segments and the second straight-line segments. In one of the pair of first straight-line segments, incline segments where the conductor is shifted by one pitch toward (Continued)

a winding axis direction are formed. In at least one of the unit winding subparts, a part of an incline segment is made by a part of each of the curved corner segments.

6 Claims, 21 Drawing Sheets

(58) Field of Classification Search
CPC .............. H02K 15/08; H02K 15/0056; H02K 15/0081; H02K 15/0085; H02K 15/0087
USPC ................................. 310/179, 180, 201, 215
See application file for complete search history.

(56) References Cited

U.S. PATENT DOCUMENTS

| | | |
|---|---|---|
| 2008/0179983 A1 | 7/2008 | Hasegawa et al. |
| 2010/0026133 A1 | 2/2010 | Fubuki et al. |
| 2011/0266912 A1* | 11/2011 | Smadja .................... H02K 3/28 |
| | | 310/208 |
| 2012/0025658 A1* | 2/2012 | Watanabe ................ H02K 3/12 |
| | | 310/179 |
| 2015/0171716 A1* | 6/2015 | Kurashige .......... H02K 15/0081 |
| | | 72/374 |

* cited by examiner (a)

(b)

(a)

(b)

STATOR COIL, STATOR, ELECTROMAGNETIC DEVICE, AND METHOD OF MANUFACTURING STATOR COIL

TECHNICAL FIELD

The present invention relates to a stator coil, a stator, an electromagnetic device, and a method of manufacturing a stator coil.

BACKGROUND ART

In an electromagnetic device such as a rotary type or direct acting type electric motor, coils are installed around a stator iron core and a magnetic field is generated by making current flow through the coils to make a mover such as rotor move. Further, in an electromagnetic device such as a generator, electricity is generated by making a mover such as a rotor by externally supplied power.

Such an electromagnetic device is mounted in a diversity of machinery. Particularly, for an electromagnetic device that is mounted in an automobile, it is strongly demanded to downsize the device and increase its efficiency (to increase output power), since a space for mounting it into a vehicle is limited and it is required to have large output power enough to make it substitutable for an engine.

In Patent Literature 1, a stator coil is described as follows: in a concentrated winding stator coil, when a conductor is wound around a tooth, upon winding lane change to a next turn, lane change segments for shifting the conductor by one pitch toward a winding axis direction are provided in a coil end.

CITATION LIST

Patent Literature

Patent Literature 1: Japanese Unexamined Patent Application Publication No. 2011-234516

SUMMARY OF INVENTION

Technical Problem

However, forming lane change segments (layer transition segments) only in straight-line segments in a coil end when viewed from the winding axis direction, as in the concentrated winding stator coil, which is hitherto known, entails a problem in which the size of a winding part increases, which makes it difficult to achieve downsizing an electromagnetic device.

Solution to Problem

According to a first aspect of the present invention, a stator coil that is wound by concentrated winding and installed in a slot of a stator includes a winding part in which a conductor is wound pitch by pitch around a tooth of the stator and connection terminals which extend from both ends of the winding part. The winding part includes a plurality of unit winding subparts of a rectangular annular shape, a unit winding subpart including a pair of first straight-line segments, a pair of second straight-line segments, and curved corner segments which join the first straight-line segments and the second straight-line segments. In one of the pair of first straight-line segments, incline segments where the conductor is shifted by one pitch toward a winding axis direction are formed. In at least one of the unit winding subparts, a part of an incline segment is made by a part of a curved corner segment.

According to a second aspect of the present invention, there is provided a method of manufacturing a stator coil that includes a winding part in which a conductor is wound pitch by pitch around a tooth of a stator and connection terminals which extend from both ends of the winding part and that is wound by concentrated winding and installed in a slot of the stator. When forming the winding part, the method includes forming a plurality of unit winding subparts having a rectangular annular shape with a pair of first straight-line segments, a pair of second straight-line segments, and curved corner segments which join the first straight-line segments and the second straight-line segments. When forming at least one of the unit winding subparts, the method includes bending a linear portion of a conductor by pressing with dice, thus forming incline segments where the conductor is shifted by one pitch toward the winding axis X direction. The method includes bending the conductor around both ends of each of the incline segments, thus forming the curved corner segments, so that a part of an incline segment is made by a part of a curved corner segment, and the incline segments are positioned in one of the pair of first straight-line segments.

Advantageous Effects of Invention

According to the present invention, it is feasible to downsize a stator coil, stator, and an electromagnetic device.

DESCRIPTION OF EMBODIMENTS

In the following, embodiments of the present invention will be described with reference to the drawings.

—First Embodiment—

Figure 1:
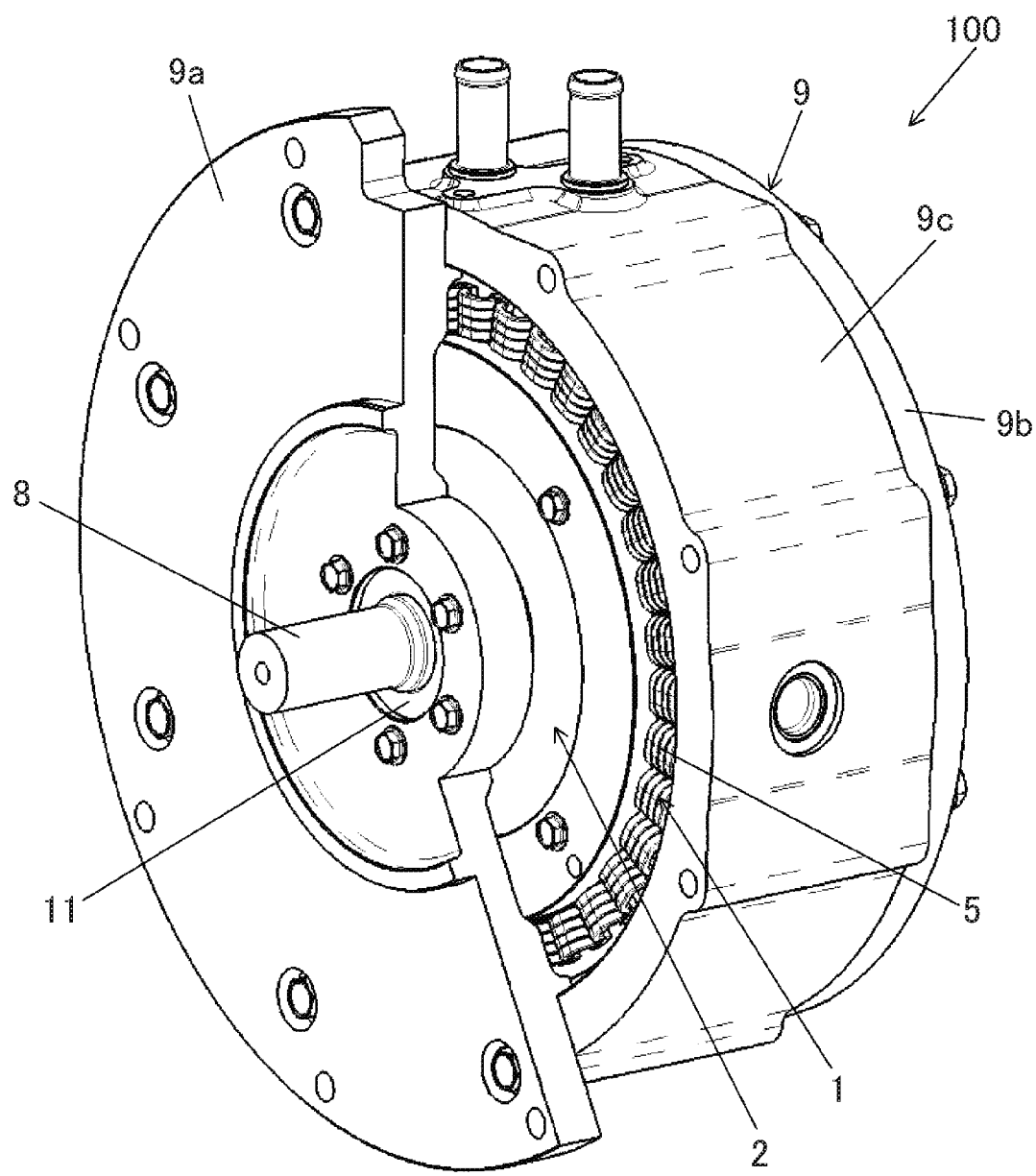
FIG. 1 is a partially cutaway perspective view depicting a rotating electric machine.
Figure 2:
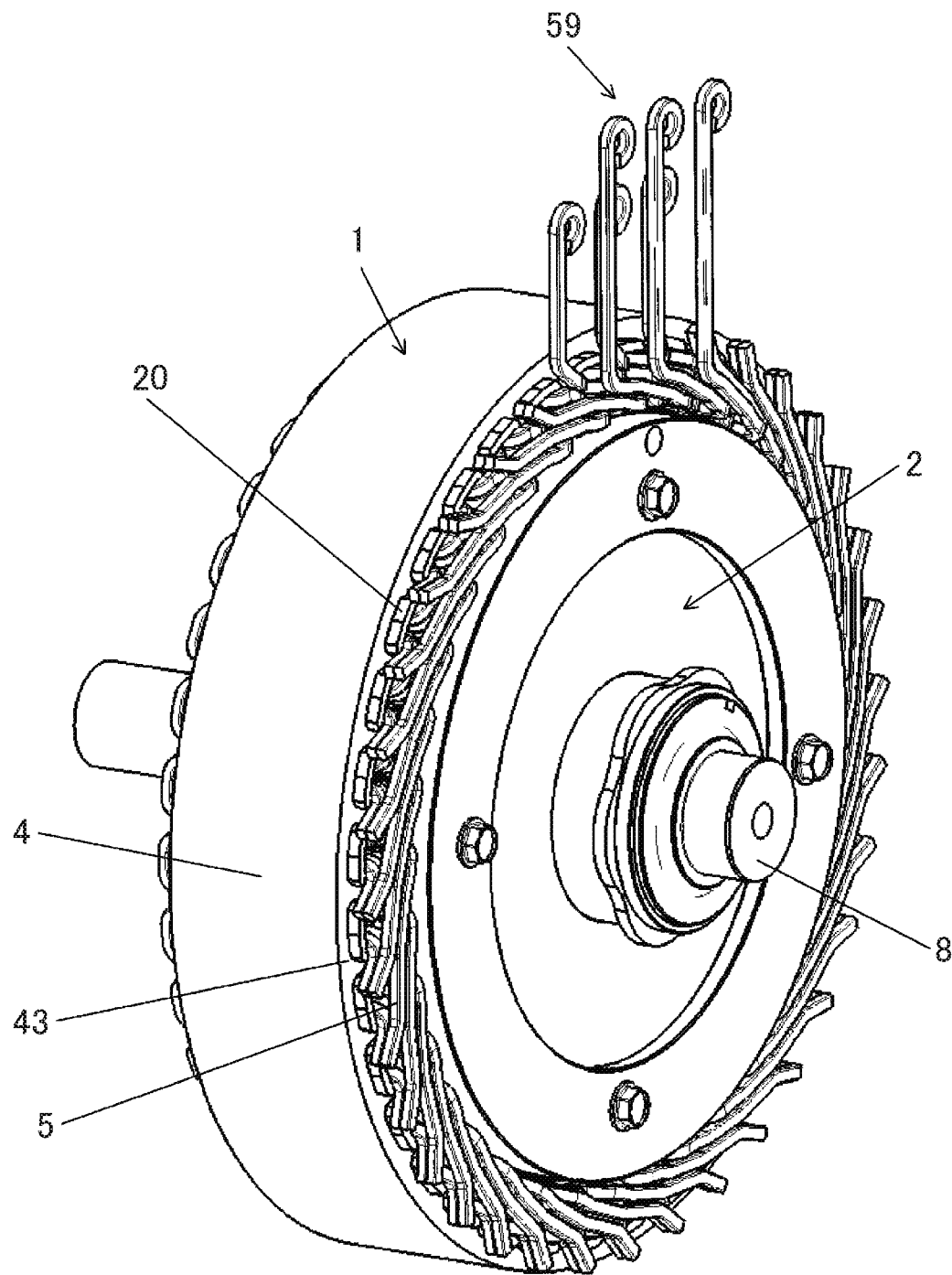
FIG. 2 is a perspective view of the rotating electric machine from which its housing is removed.
Figure 3:
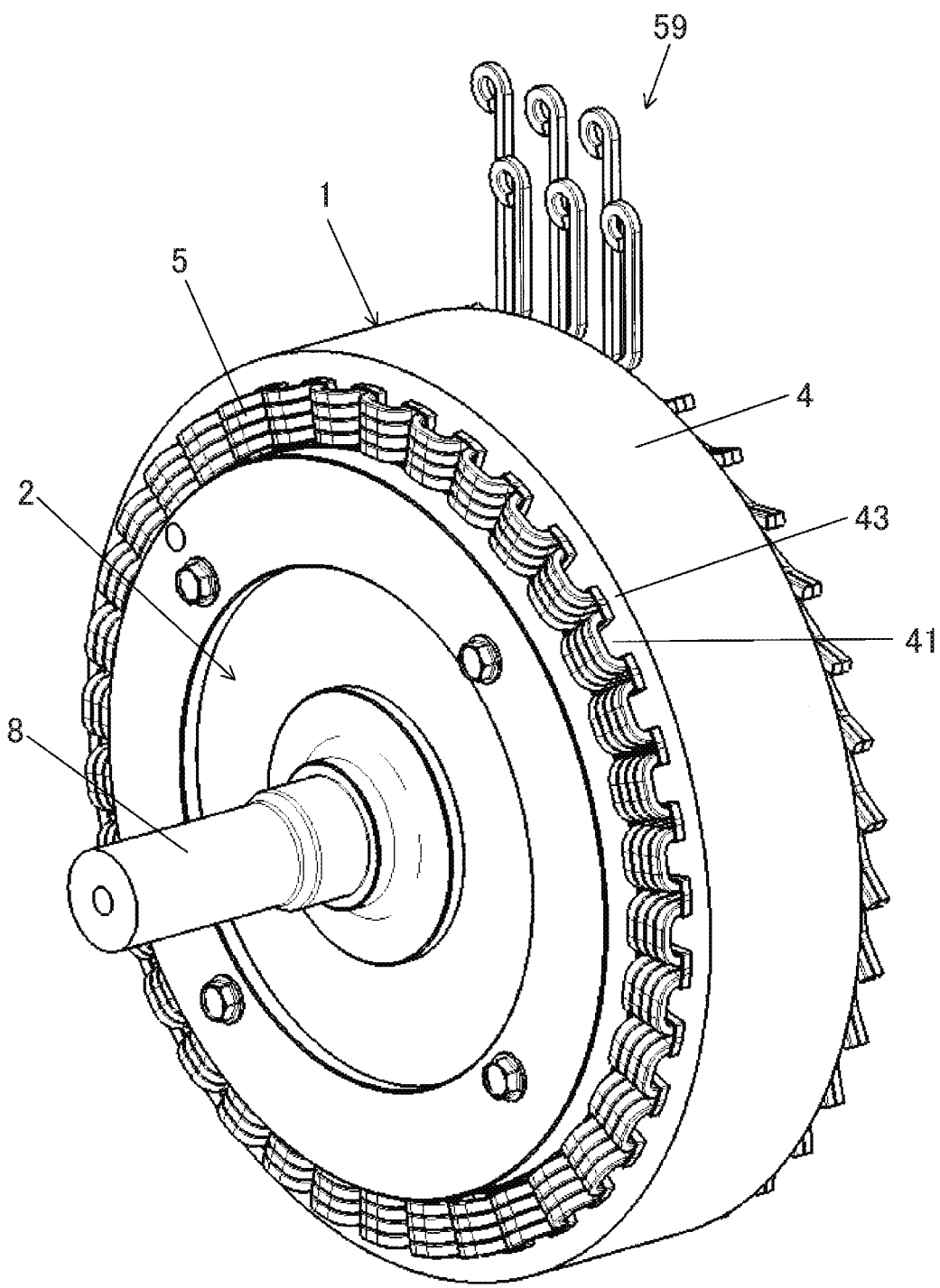
FIG. 3 is a perspective view of the rotating electric machine from which its housing is removed.

FIG. 1 is a partially cutaway perspective view depicting a rotating electric machine 100. In the depiction of FIG. 1, a part of a housing 9 is left out. FIG. 2 and FIG. 3 are perspective views of the rotating electric machine 100 from which its housing 9 is removed. FIG. 3 is a perspective view of the rotating electric machine 100 viewed from the other side.

The rotating electric machine 100 pertaining to the present embodiment can be applied to a pure electric vehicle that runs only powered by, e.g., the rotating electric machine 100 and a hybrid type electric vehicle that is driven by both an engine and the rotating electric machine 100. As depicted in FIG. 1, the rotating electric machine 100 operates as an electric motor or a generator and includes a stator (hereinafter denoted as a stator 1), a rotor (hereinafter denoted as a rotor 2) that makes a rotational motion with respect to the stator 1, and a housing 9 that encloses and holds the rotor 2 and the stator 1.

As depicted in FIG. 2 and FIG. 3, the rotor 2 is disposed so that is can rotate along the inner side of the stator 1 of a hollow cylinder shape. The rotor 2 has a rotor core (rotor iron core) and permanent magnets. A cylindrical shaft (rotating shaft) 8 is press fit in a hollow portion of the rotor core and the rotor core is fixed to the shaft 8. Permanent magnets are arranged adjacent to the outer periphery of the rotor core and evenly spaced along a circumferential direction. When a three-phase alternating current is allowed to flow through stator coils 5 which will be described later, a rotating magnetic field arises in the stator 1 and this rotating magnetic field interacts with the permanent magnets of the rotor 2, thus producing torque.

As depicted in FIG. 1, the housing has a hollow cylindrical center bracket 9c and a pair of end brackets 9a, 9b installed to close the openings at both ends of the center bracket 9c. Each of the end brackets 9a, 9b is provided with a bearing 11. The stator 1 is held by the center bracket 9c and the shaft 8 of the rotor 2 is rotatably held by the bearing 11 provided in each of the end brackets 9a, 9b.

Figure 4:
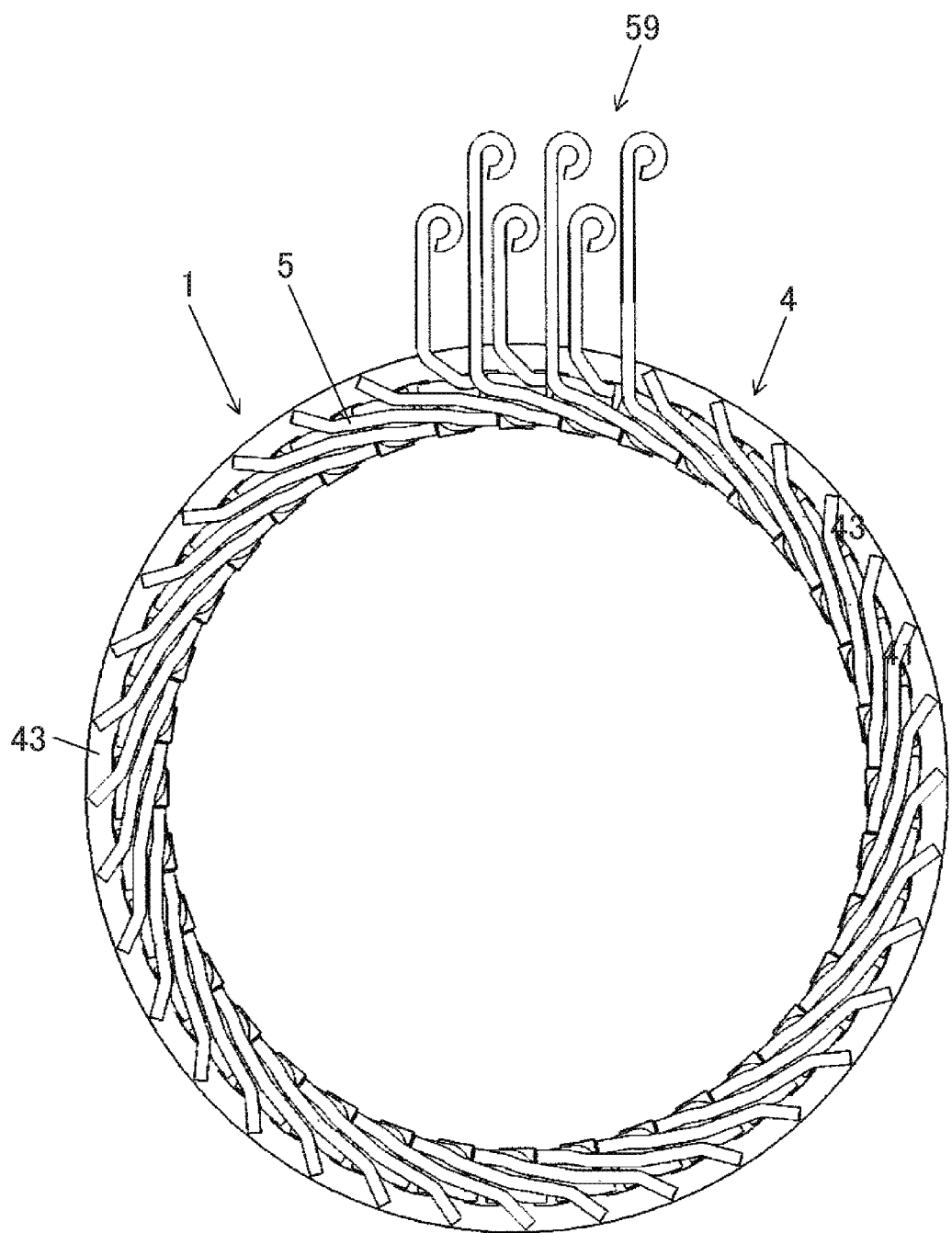
FIG. 4 is a view depicting a stator viewed from an axial direction.
Figure 5:
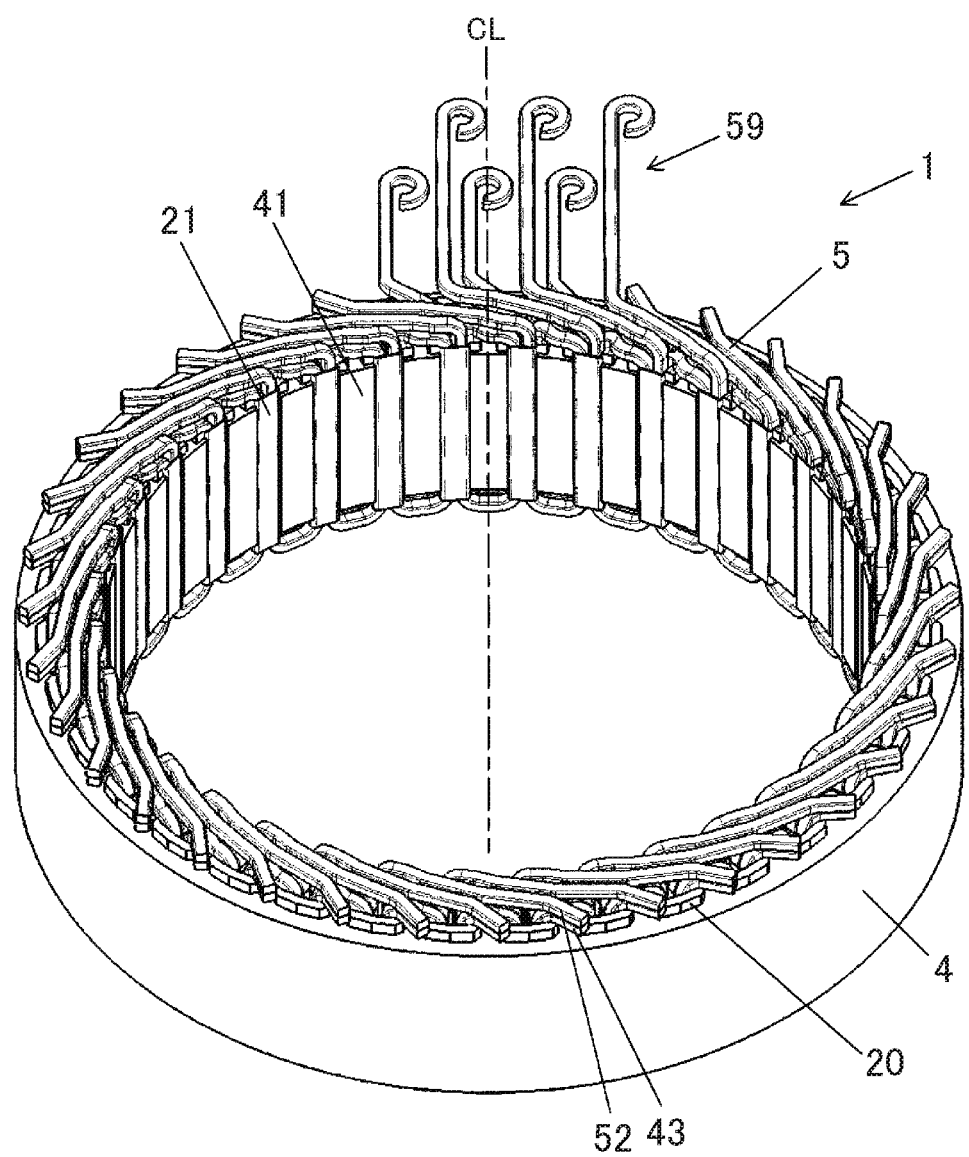
FIG. 5 is a perspective view of the stator.

FIG. 4 is a view depicting the stator 1 viewed from an axial direction and FIG. 5 is a perspective view of the stator 1. As depicted in FIG. 4 and FIG. 5, the stator 1 includes a hollow cylindrical stator core (stator iron core) 4 and stator coils 5 (see FIG. 10) constituting U-phase, V-phase, and W-phase windings.

The U-phase, V-phase, and W-phase windings are wound by concentrated winding and the end of each of the U-phase, V-phase, and W-phase windings is provided with a power supply connection terminal 59. The power supply connection terminal 59 is connected to a power converter (inverter) via a conductive member which is not depicted. Direct-current (DC) power from a battery which is not depicted is converted to alternating-current (AC) power by the power converter and the AC power is supplied to each phase winding via the power supply connection terminal 59, thereby generating a rotating magnetic field to rotate the rotor 2.

Figure 6:
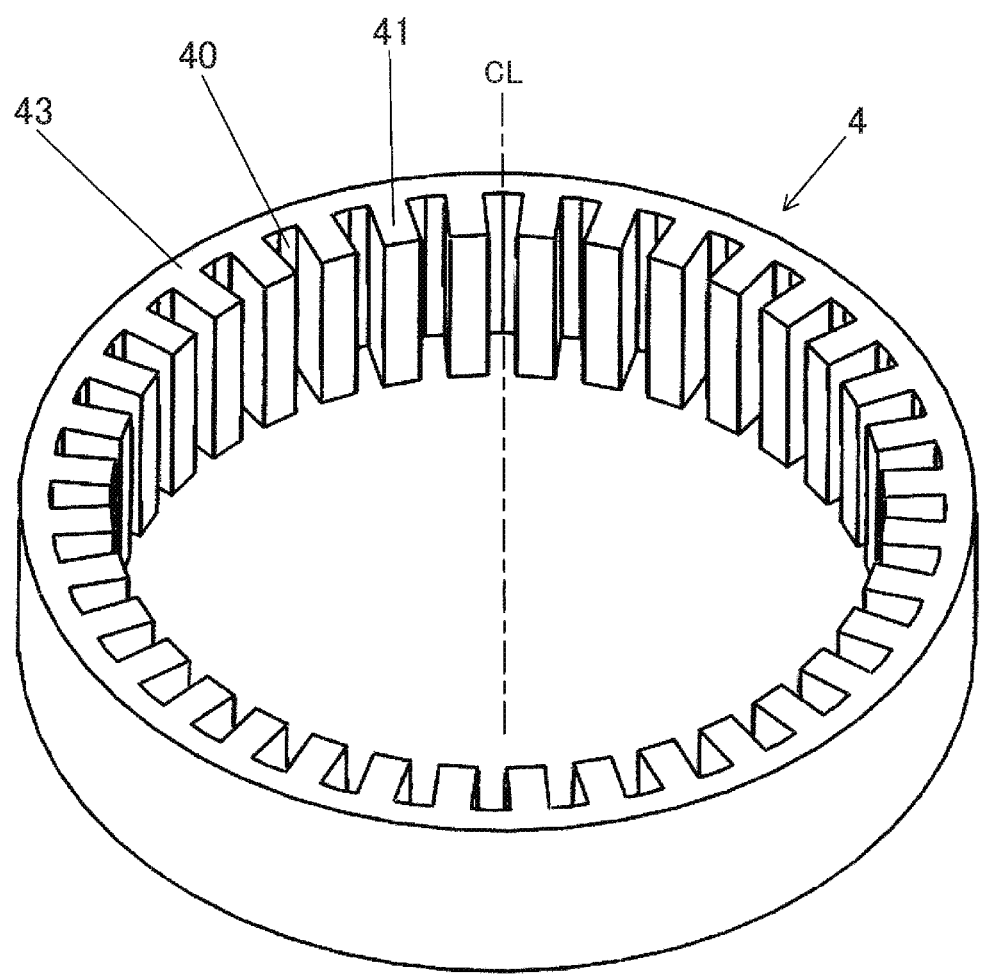
FIG. 6 is a perspective view of a stator core.

FIG. 6 is a perspective view of the stator core 4. As depicted in FIG. 6, in the inner periphery of the stator core 4, a plurality of slots 40 and teeth 41 which extend in a direction of a central axis CL (which may simply be referred to as an axial direction hereinafter) of the stator core 4 are formed alternately and to be evenly spaced in a circumferential direction. The stator core 4 is formed by laminating a plurality of core plates which are annular in shape, formed by punching a magnetic steel plate having a thickness of, e.g., approx. 0.05 to 1.0 mm by press working by punching. The respective teeth 41 are formed to protrude from an annular core back 43 toward the central axis CL, having a constant width in a circumferential direction. The respective teeth 41 serve to guide a rotating magnetic field generated by the supply of AC power to the stator coils 5 to the rotor 2 and generate rotating torque in the rotor 2.

The slots are made as open slots and configured so that a winding part 50 (see FIG. 10) of the stator coils 5 which will be described later can be inserted from the inward side of the stator core 4. The slots 40 are each defined by a peripheral wall which is comprised of the lateral faces, facing each other in a circumferential direction, of a pair of neighboring teeth 41 and the inner periphery of the core back 43.

Figure 7:
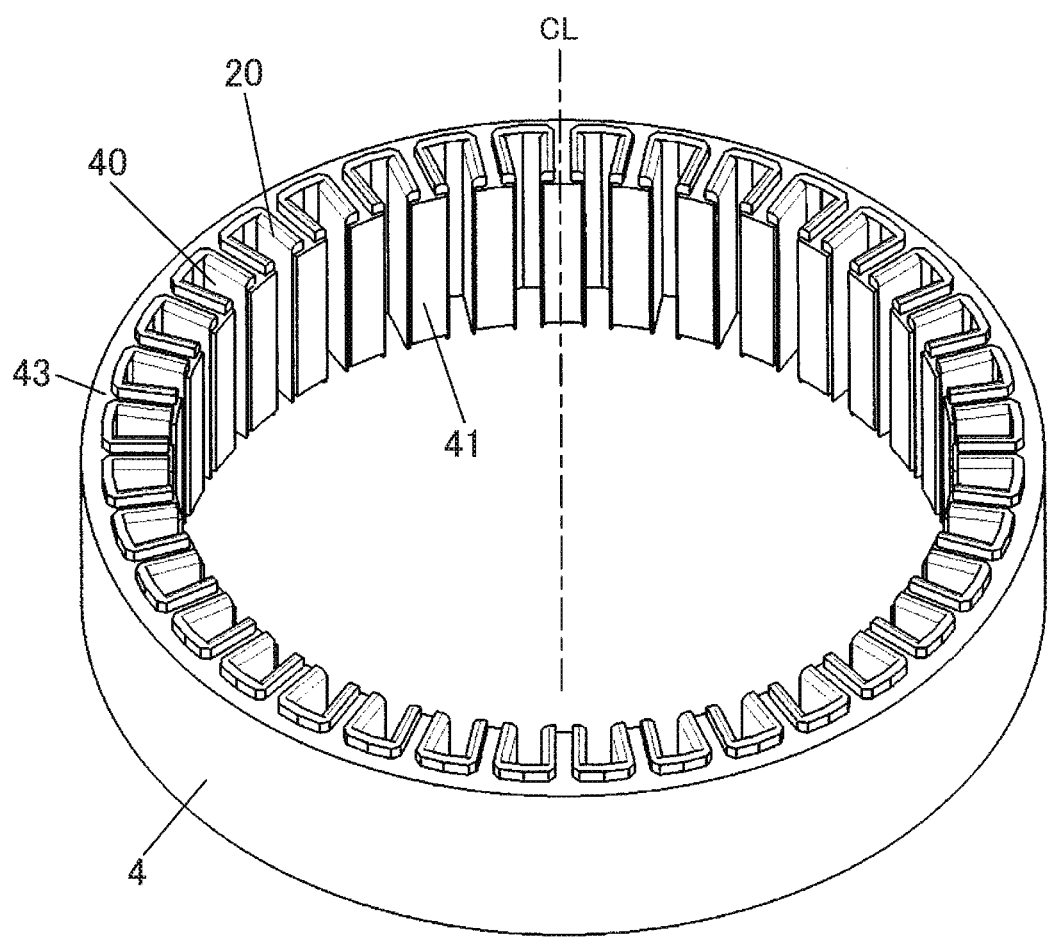
FIG. 7 is a perspective view of the stator core in a state when an insulator is installed in each of slots.

FIG. 7 is a perspective view of the stator core 4 in a state when an insulator 20 is installed in each of the slots 40. As depicted in FIG. 7, in each of the slots 40, an insulator 20 having a U-shaped cross section is installed. As depicted in FIG. 5, the stator coils 5 which are concentrated winding coils are installed in the slots 40 with the insulator 20 intervening therebetween. A drop-off preventing piece 21 having a U-shaped cross section is installed at an open end of each of the slots 40.

The insulator 20 and the drop-off preventing piece 21 are made of a resin material having an insulation property, such as polyphenylene sulfide (PPS) and polybutylene terephthalate (PBT).

Figure 8:
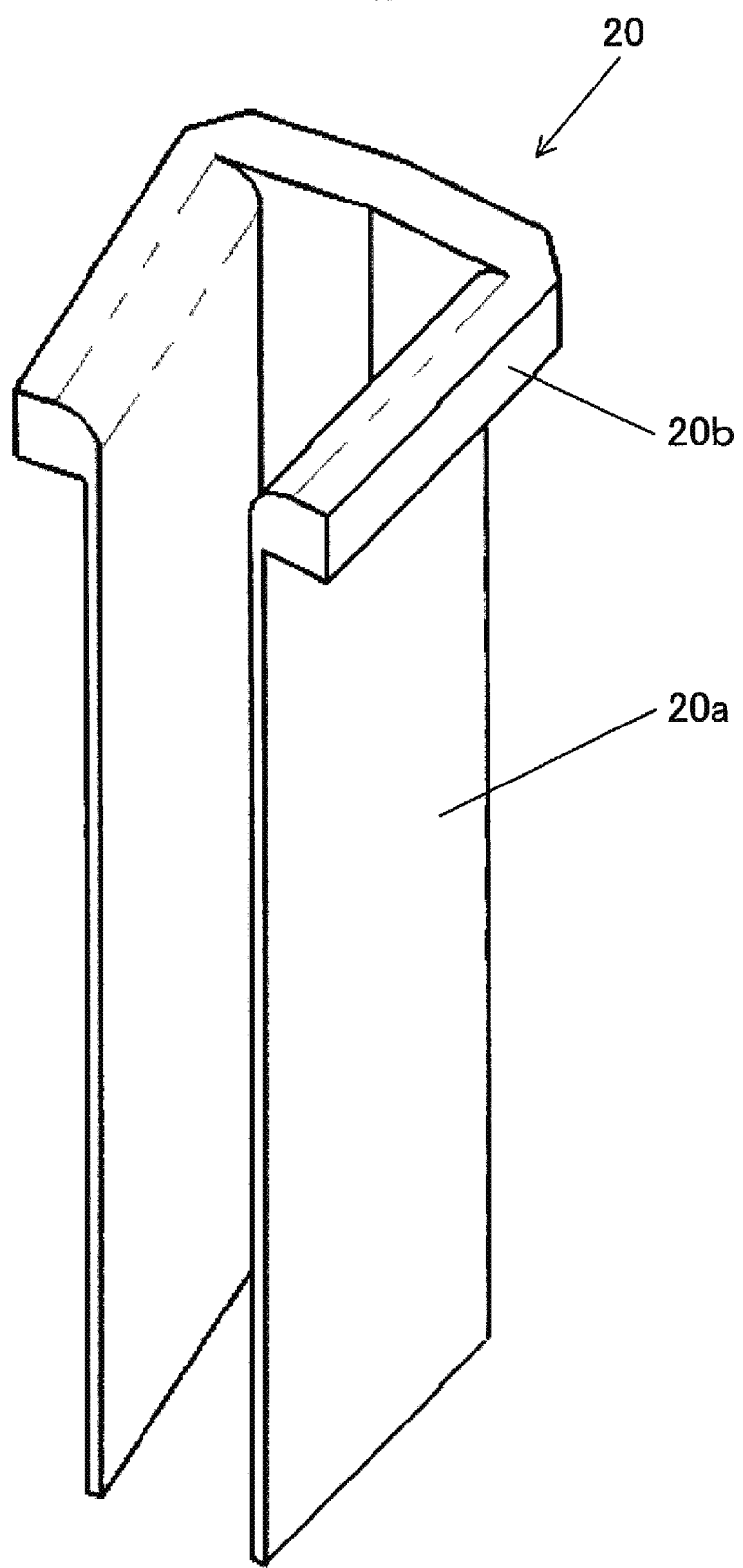
FIG. 8 is a perspective view depicting the insulator.
Figure 9:
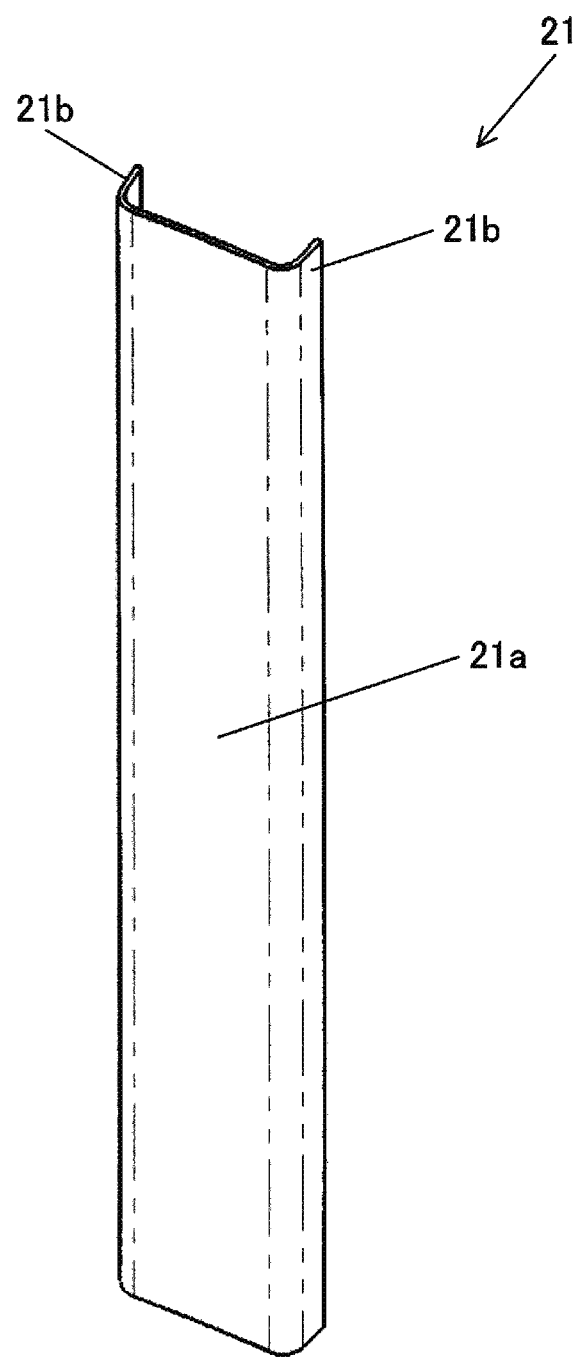
FIG. 9 is a perspective view depicting a drop-off preventing piece.

FIG. 8 is a perspective view depicting the insulator 20 and FIG. 9 is a perspective view depicting the drop-off preventing piece 21. As depicted in FIG. 8, the insulator 20 has a covering part 20a which covers the peripheral wall of a slot 40 and a flange part 20b which abuts on an axial direction end face of the stator core 4 at one end of the covering part 20a in a longitudinal direction.

As depicted in FIG. 9, the drop-off preventing piece 21 has a covering part 21a which covers the inward opening of a slot 40 and an insertion part 21b which is inserted between a lateral face of a tooth 41 in a circumferential direction and the covering part 20a of an insulator 20.

As depicted in FIG. 5, insulators 20 and drop-off preventing pieces 21 are installed in the stator core 4, so that insulation between the stator coils 5 and the stator core 4 is ensured by the insulators 20 and the stator coils 5 are prevented from dropping off inward by the drop-off preventing pieces 21.

Figure 10:
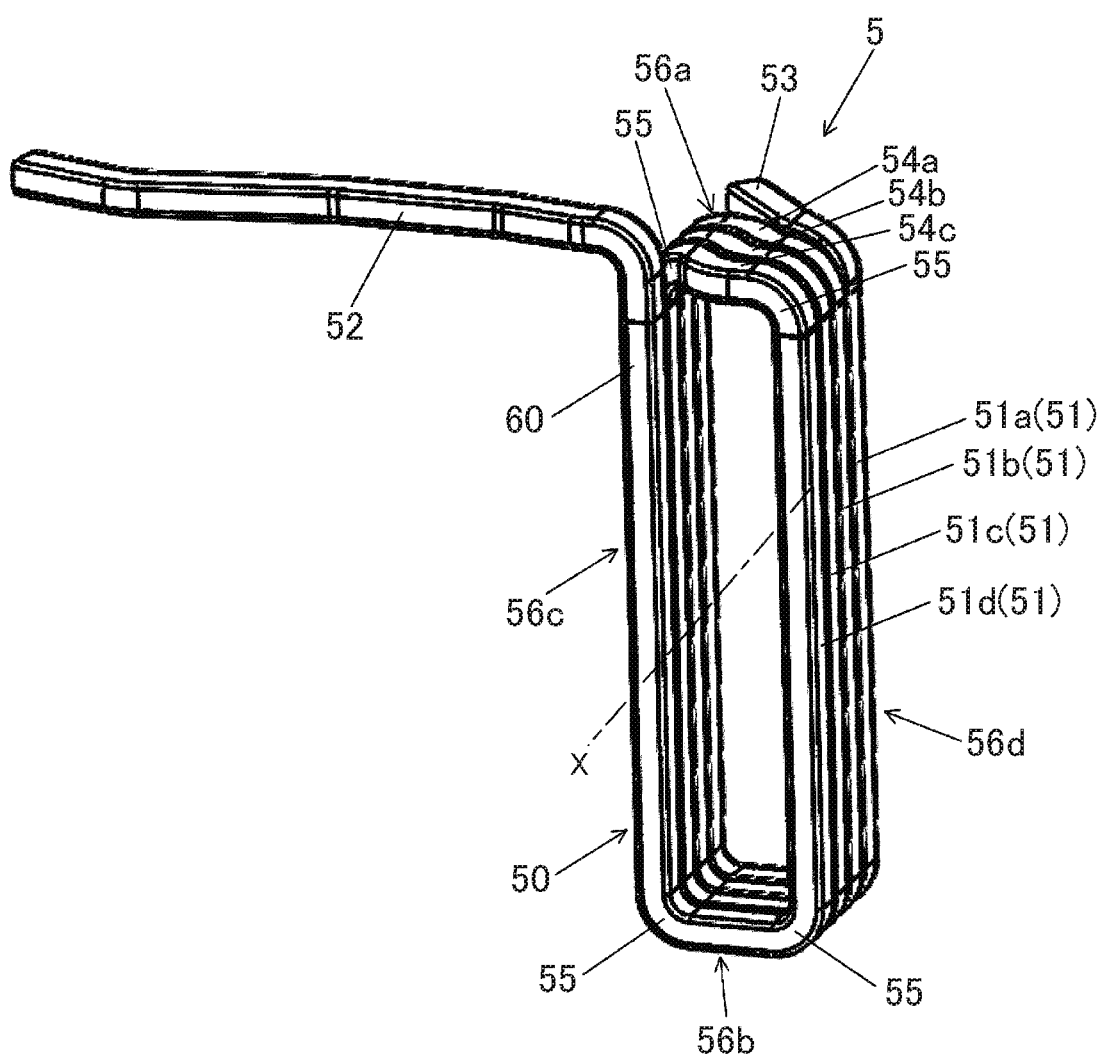
FIG. 10 is a perspective view depicting a stator coil.

FIG. 10 is a perspective view depicting a stator coil 5. As depicted in FIG. 10, each stator coil 5 includes a winding part 50 in which a conductor 60 is wound pitch by pitch around a tooth 41 of the stator 1 and connection terminals 52, 53 which extend from both ends of the winding part 50.

A connection terminal 52 of one stator coil 5 is joined to a connection terminal 53 of another stator coil 5 (see FIG. 5). A plurality of stator coils 5 are joined together, thereby forming a single phase (U-phase, V-phase, or W-phase) winding. The conductor 60 making a stator coil 5 is a rectangular wire sheathed for insulation.

Figure 11:
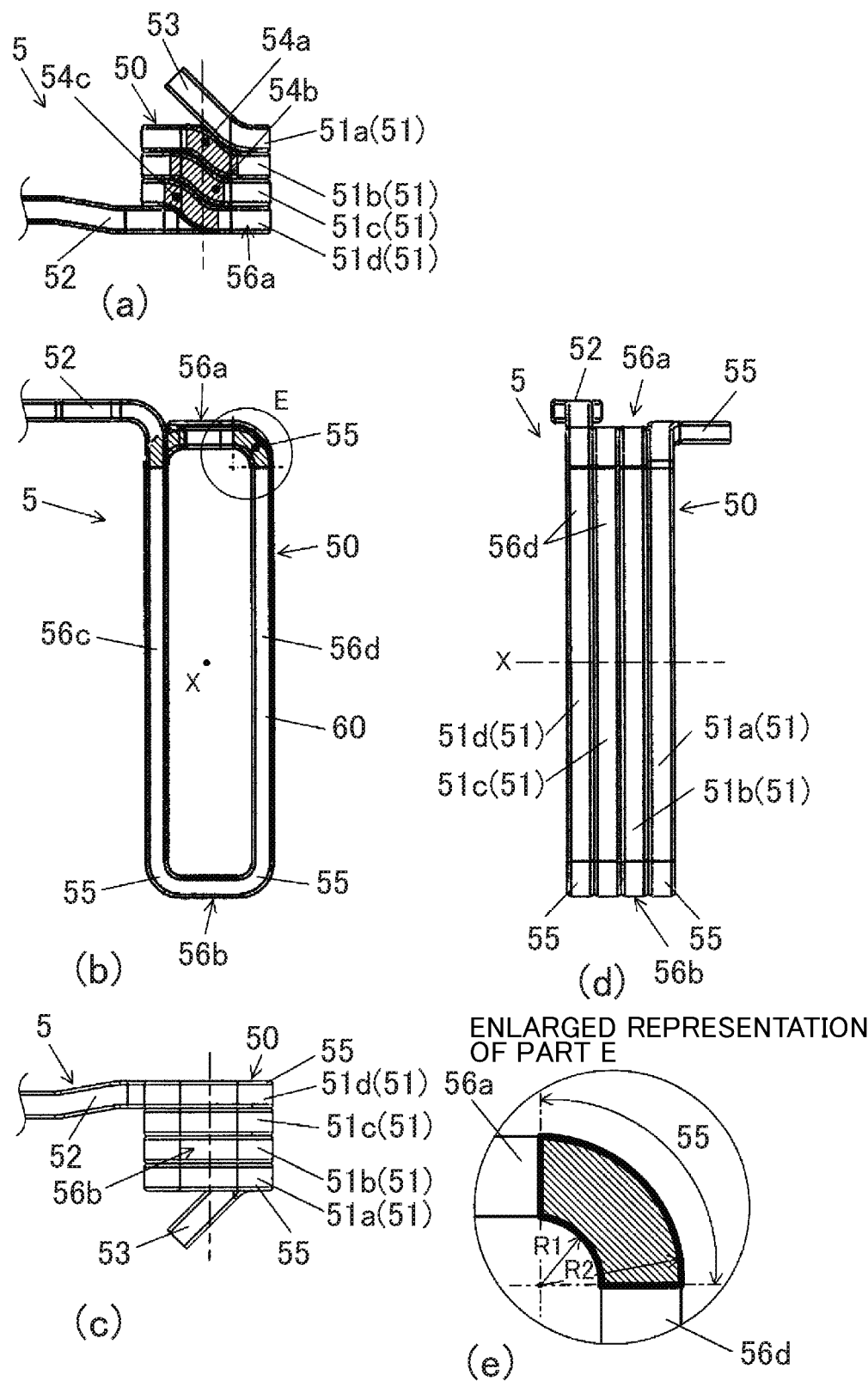
FIG. 11($a$) is a top view of the stator coil; ($b$) is a front view of the stator coil; ($c$) is a bottom view of the stator coil; ($d$) is a side view of the stator coil; and ($e$) is an enlarged schematic representation of part E in ($b$).

FIG. 11 are views depicting a stator coil 5. FIG. 11(a) is a top view of the stator coil 5 and FIG. 11(b) is a front view of the stator coil 5. FIG. 11(c) is a bottom view of the stator coil 5 and FIG. 11(d) is a side view of the stator coil 5. FIG. 11(e) is an enlarged schematic representation of part E in FIG. 11(b). In FIG. 11(a), portions representing layer transition segments 54a, 54b, 54c are hatched and, in FIG. 11(b) and FIG. 11(e), a portion representing a curved corner segment 55 is hatched.

As depicted in FIG. 10 and FIG. 11, a winding part 50 includes four unit winding subparts 51 (51a, 51b, 51c, 51d). Each unit winding subpart 51 (51a, 51b, 51c, 51d) includes a pair of first straight-line segments 56a, 56b, a pair of second straight-line segments 56c, 56d, and curved corner segments 55 which join the first straight-line segments 56a, 56b and the second straight-line segments 56c, 56d.

As depicted in FIG. 11(b), each unit winding subpart 51 appears to be of a rectangular annular shape when viewed from a winding axis X direction. First straight-line segments 56a, 56b and second straight-line segments 56c, 56d refer to conductor segments which are straight when viewed from the winding axis X direction.

As depicted in FIG. 11(e), a curved corner segment 55 is a segment which is curved in a range of 90 degrees so as to have an inside diameter dimension of R1 and an outside diameter dimension of R2 with a central focus on point O (R2>R1). Curved corner segments 55 mentioned herein refer to conductor segments curved between first straight-line segments 56a, 56b extending straight and second straight-line segments 56c, 56d extending straight within a plane perpendicular to the winding axis X direction.

Figure 12:
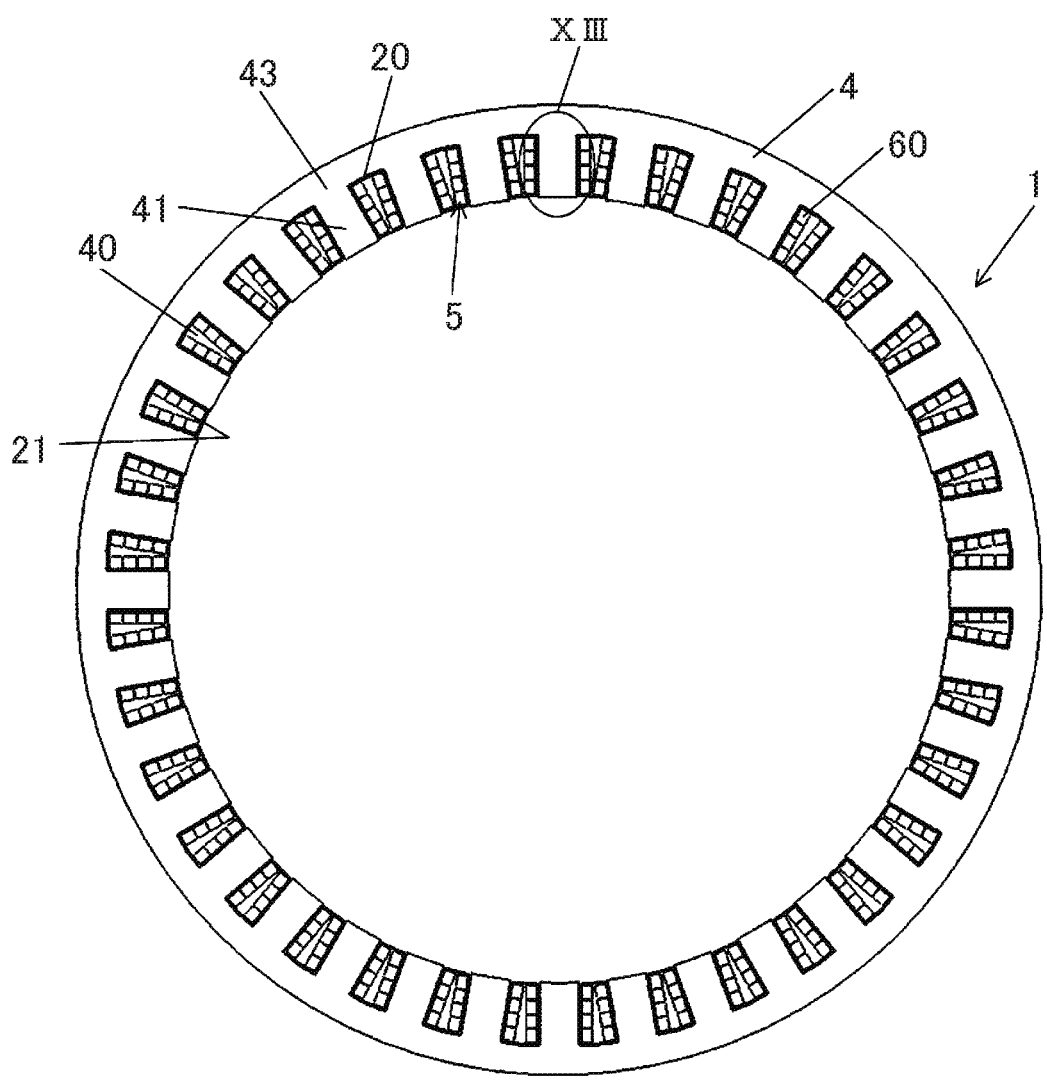
FIG. 12 is a schematic cross-sectional view of the stator.
Figure 13:
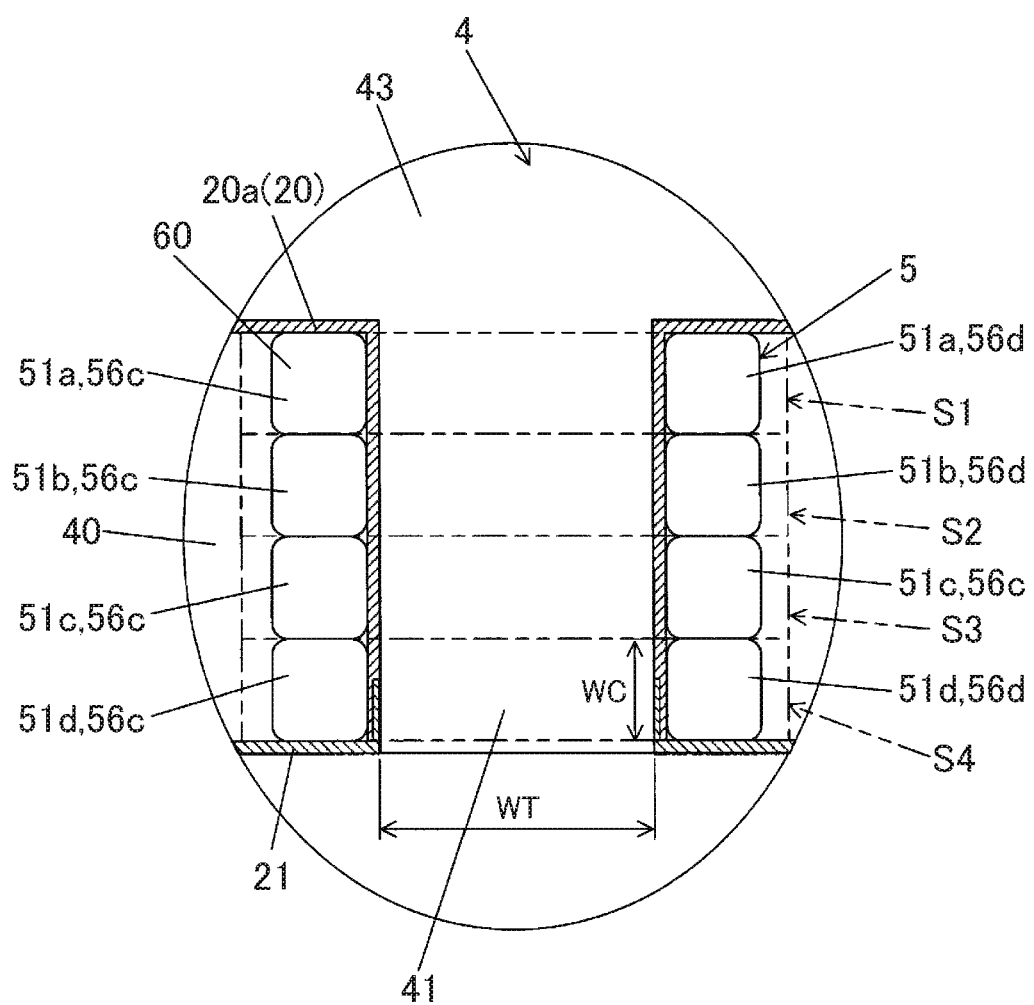
FIG. 13 is a partially enlarged schematic representation depicting a cross section of a stator coil which is wound around one tooth.

FIG. 12 is a schematic cross-sectional view of the stator 1 and schematically represents a cross section cut along a plane perpendicular to the central axis CL of the stator core 4. FIG. 13 is a partially enlarged schematic representation depicting a cross section of a stator coil 5 which is wound around one tooth 41 and an enlarged schematic representation of part X III in FIG. 12. As described previously, an insulator 20 is positioned between each stator coil 5 and each tooth 41 to ensure insulation. A unit winding subpart 51 is positioned so that one lateral face of a rectangular conductor 60 will be parallel to the lateral faces of a tooth 41 and the one lateral face of the conductor 60 is in close contact with a tooth 41 with the covering part 20a of an insulator 20 intervening therebetween. Unit winding subparts 51 are also in close contact with each other, i.e., their lateral faces of the conductor 60 facing each other are in close contact with each other.

As described previously, four unit winding subparts 51 are installed around each tooth 41. For convenience of description, each of the unit winding subparts 51 is referred to as a first winding subpart 51a, a second winding subpart 51b, a third winding subpart 51c, and a fourth winding subpart 51d according to order of their position from the outer periphery of a slot 40 (position of the core back 43) toward its inner periphery (position of the slot opening).

As depicted in FIG. 13, the second straight-line segment 56c and the second straight-line segment 56d comprised in the first winding subpart 51a are placed facing each other across a tooth 41. Similarly with regard to the second winding subpart 51b, third winding subpart 51c, and fourth winding subpart 51d, the second straight-line segment 56c and the second straight-line segment 56d comprised in each unit winding subpart 51 are placed facing each other across the tooth 41. Stated differently, the second straight-line segment 56c and the second straight-line segment 56d of each unit winding subpart 51 are placed so as to be positioned at the same distance from the central axis CL of the stator core 4.

As depicted in FIGS. 11(a), 11(c), and 11(d), and FIG. 13, four unit winding subparts 51 (51a, 51b, 51c, 51d) are aligned in line along the winding axis X direction and form the winding part 50 having a multiple layer structure (lamination structure) in the radial direction of the stator core 4. As depicted in FIG. 13, each layer within a slot 40 in which the respective subparts of the conductor 60 are arranged is hereinafter referred to as a first layer (S1), a second layer (S2), a third layer (S3), and a fourth layer (S4) according to order of their position from the outer periphery of the slot 40 (position of the core back 43) toward its inner periphery (position of the slot opening).

In the case of concentrated winding stator coils 5, when the conductor 60 is wound, upon winding lane change to a next turn, there occurs a need to shift the conductor 60 by one pitch toward the winding axis X direction (corresponding to a radial direction of the stator core 4), that is, displace the conductor 60 toward the winding axis X direction by a distance corresponding to the width of the conductor toward the winding axis X direction. As depicted in FIG. 10 and FIG. 11(a), in the present embodiment, a layer transition segment 54a for winding lane change from the first layer (S1) to the second layer (S2), a layer transition segment 54b for winding lane change from the second layer (S2) to the third layer (S3), and a layer transition segment 54c for winding lane change from the third layer (S3) to the fourth layer (S4) are each formed in the first straight-line segment 56a that is placed outside a slot 40.

More specifically, the layer transition segment 54a is an incline segment that guides the conductor 60 coming out of a slot from the first layer (S1) in one slot 40 to the second layer (S2) in another adjacent slot 40. Likewise, the layer transition segment 54b is an incline segment that guides the conductor 60 coming out of a slot from the second layer (S2) in one slot 40 to the third layer (S3) in another adjacent slot 40. The layer transition segment 54c is an incline segment that guides the conductor 60 coming out of a slot from the third layer (S3) in one slot 40 to the fourth layer (S4) in another adjacent slot 40.

As above, the layer transition segments 54a, 54b, 54c are formed to make a slant passage from a certain stage toward an adjacent stage within the plane perpendicular to the central axis CL of the stator core 4. As depicted in FIG. 11(a), the layer transition segments 54a, 54b, 54c are arranged so as to be slightly non-aligned vertically in relation to one another in a winding direction of the winding part 50, so that adjoining first straight-line segments 56a are brought in close contact with each other.

Figure 14:
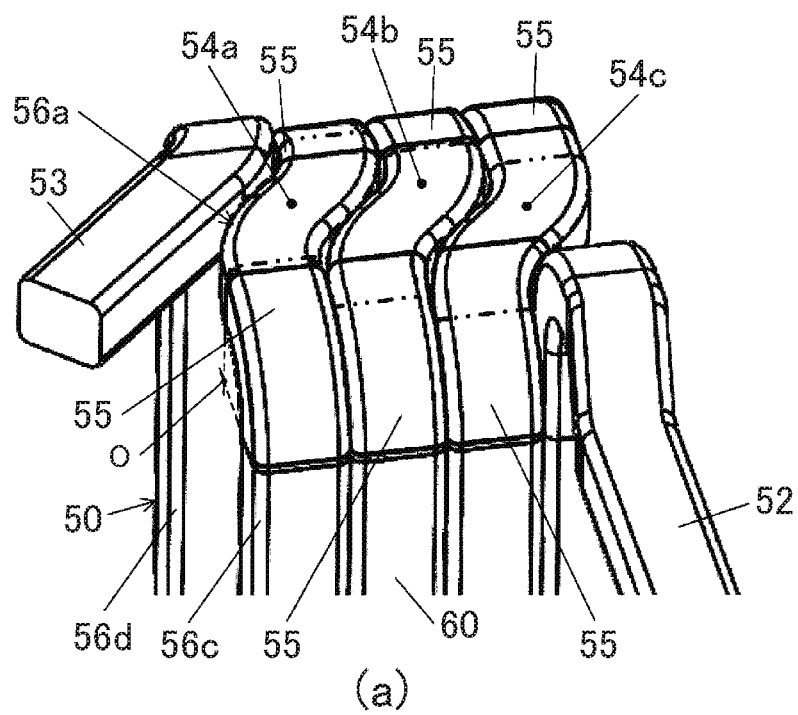
FIG. 14($a$) is a perspective view depicting layer transition segments formed in first straight-line segments; and ($b$) is a view in which portions representing layer transition segments and curved corner segments are hatched in ($a$).
Figure 14:
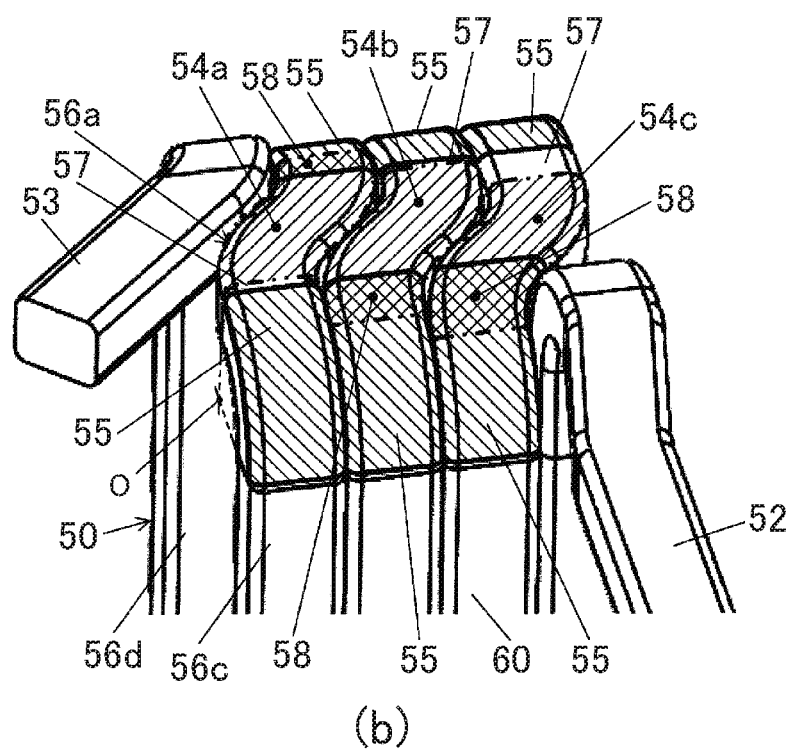

FIG. 14(a) is a perspective view depicting layer transition segments 54a, 54b, 54c formed in first straight-line segments 56a. FIG. 14(b) is a view in which portions representing layer transition segments 54a, 54b, 54c and curved corner segments 55 are hatched in FIG. 14(a). As depicted, in the present embodiment, a part of each layer transition segment 54a, 54b, 54c is formed by a part of a curved corner segment 55.

One end of a layer transition segment 54a does not overlap a curved corner segment 55 (see a curved corner segment 55 depicted in the front side in FIG. 14(b)) and a non-overlap region 57 (not hatched in the depiction) is formed between the layer transition segment 54a and the curved corner segment 55. The other end of the layer transition segment 54a overlaps a curved corner segment 55 (see a curved corner segment 55 depicted in the back side in FIG. 14(b)) and an overlap region 58 is formed.

One end of a layer transition segment 54b overlaps a curved corner segment 55 (see a curved corner segment 55 depicted in the front side in FIG. 14(b)) and an overlap region 58 is formed. The other end of the layer transition segment 54b does not overlap a curved corner segment 55 (see a curved corner segment 55 depicted in the back side in FIG. 14(b)) and a non-overlap region 57 (not hatched in the depiction) is formed between the layer transition segment 54b and the curved corner segment 55.

One end of a layer transition segment 54c overlaps a curved corner segment 55 (see a curved corner segment 55 depicted in the front side in FIG. 14(b)) and an overlap region 58 is formed. The other end of the layer transition segment 54c does not overlap a curved corner segment 55 (see a curved corner segment 55 depicted in the back side in FIG. 14(b)) and a non-overlap region 57 (not hatched in the depiction) is formed between the layer transition segment 54c and the curved corner segment 55.

As above, by configuring curved corner segments 55 in the end portions of the layer transition segments 54a, 54b, 54c, it is possible to decrease a dimension of a winding part 50 in a tooth width direction and enable downsizing the stator coils 5. And now, the layer transition segments 54a, 54b, 54c may also be collectively termed herein as a layer transition segment 54.

Figure 15:
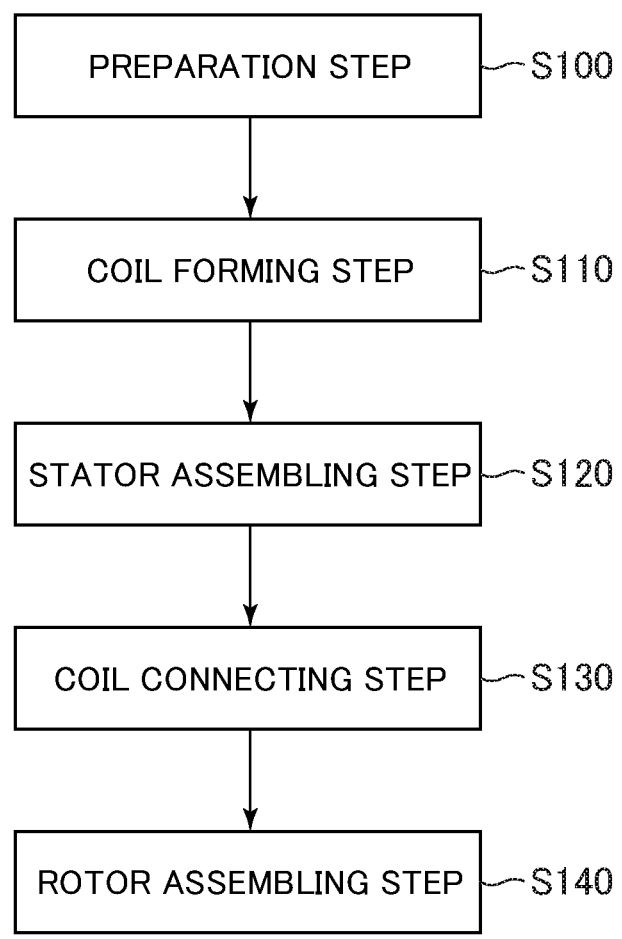
FIG. 15 is a diagram to explain a process of manufacturing the rotating electric machine.

A process of manufacturing a rotating electric machine 100 is described. FIG. 15 is a diagram to explain the process of manufacturing the rotating electric machine 100. As depicted in FIG. 15, the process of manufacturing the rotating electric machine 100 includes a preparation step S100, a coil forming step S110, a stator assembling step S120, a coil connecting step S130, and a rotor assembling step S140.

—Preparation Step—

In the preparation step S100, all components constituting the rotating electric machine 100 are prepared, including, e.g., a center bracket 9c, end brackets 9a, 9b, a stator core 4, a rotor 2, etc. Permanent magnets are pre-installed in the rotor core of the rotor 2 and the shaft 8 is press fit in the hollow portion of the rotor core and integrated with the rotor core.

—Coil Forming Step—

In the coil forming step, stator coils 5 which are to be installed around the respective teeth 41 are formed (see FIG. 10). The coil forming step S110 will be detailed later.

—Stator Assembling Step—

In the stator assembling step S120, the stator core is fixed to the center bracket 9c by shrink fitting. The center bracket 9c which is pre-heated and whose inside diameter has been widen by thermal expansion is fit on the stator core 4. By cooling the center bracket 9c, its inside diameter is shrunk to tighten the outer periphery of the stator core 4.

—Coil Connecting Step—

In the coil connecting step S130, the respective stator coils 5 are installed around the teeth 41. Install a winding part 50 around a tooth 41 from inward of the stator core 4 and join a connection terminal 52 of one stator coil 5 to a connection terminal 53 of another stator coil 5, thus forming each phase (U-phase, V-phase, W-phase) winding. And now, the insulators 20 should be pre-installed in the stator core 4 and, after that, install the stator coils 5 around the teeth and install the drop-off preventing pieces 21 from the opening ends of the slots 40.

The second straight-line segments 56c, 56d which make long parallel sides of a conductor winding turn of a unit winding subpart 51 are placed within a slot 40, and the first straight-line segments 56a, 56b which make short parallel sides of a conductor winding turn of a unit winding subpart 51 are placed outside the slot 40.

—Rotor Assembling Step—

In the rotor assembling step S140, install the shaft 8 in the bearing 11 of one end bracket 9a. Fit the one end bracket 9a to close up one open side of the center bracket 9c so that the rotor 2 will be placed inside the stator 1 and fasten the end bracket 9a to the center bracket 9c. Fit the other end bracket 9b to close up the other open side of the center bracket 9c and fasten the end bracket 9b to the center bracket 9c. Through the above steps, the rotating electric machine 100 is completed.

Figure 16:
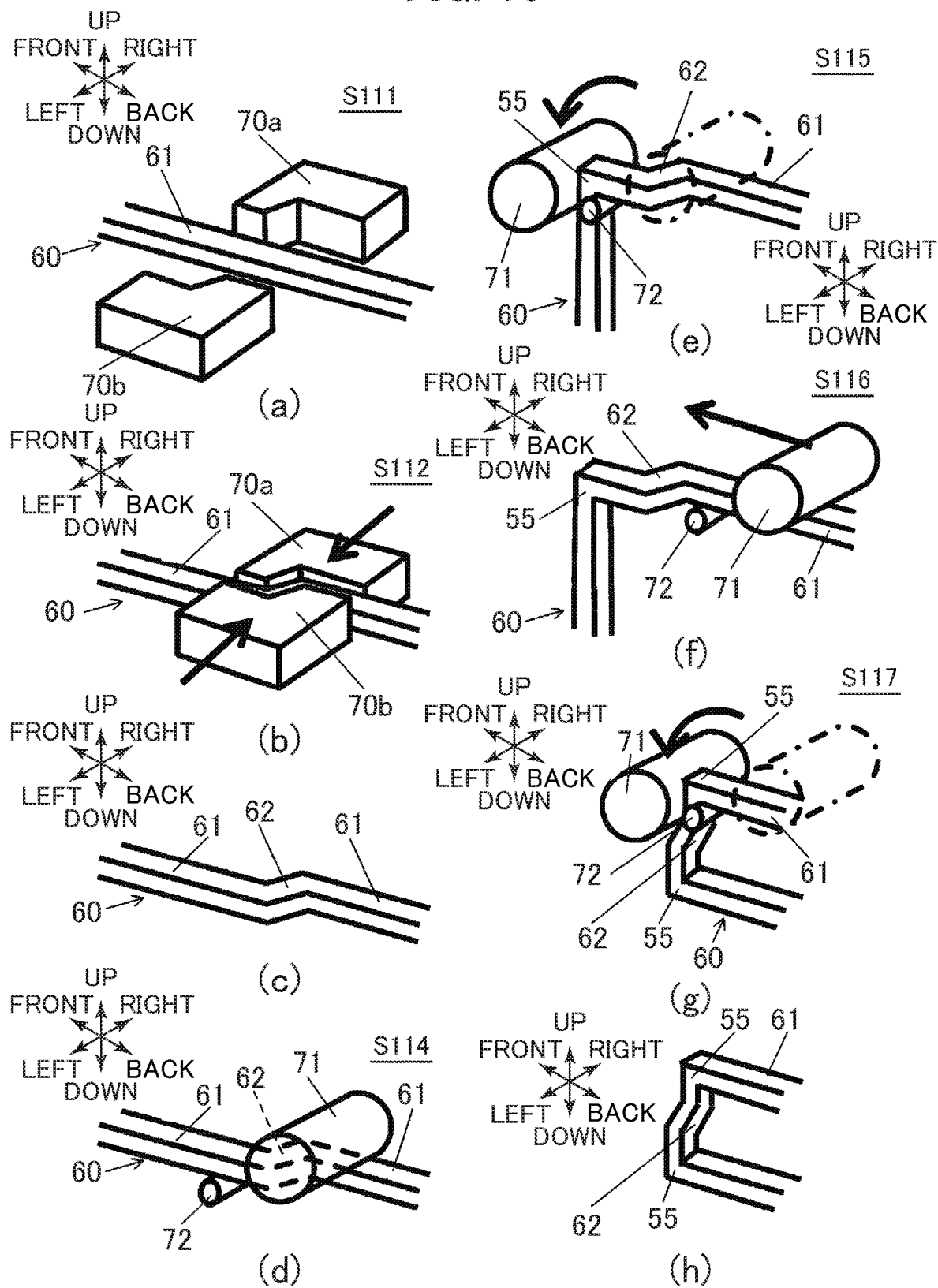
FIG. 16 is a diagram to explain a process of manufacturing a stator coil.

The coil forming step S110 is detailed with reference to FIG. 16. FIG. 16 is a diagram to explain the process of manufacturing a stator coil 5. The coil forming step S110 forms a plurality of unit winding subparts 51 of a rectangular annular shape by repeatedly performing bending work on one linear conductor 60. An incline segment 62 which makes each of the layer transition segments 54a, 54b, 54c is formed by press working of the linear conductor 60 with dice 70a, 70b and, after that, curved corner segments 55 including a part of the incline segment 62 are formed by performing bending work on the conductor at forward and rear ends of the incline segment.

A step of forming an incline segment 62 and forming curved corner segments 55 at the forward and rear ends of that segment is described below. That is, a step of forming a layer transition segment 54 to be formed in a first straight-line segment 56a, which is depicted in FIG. 11, and forming a curved corner segment 55 between a second straight-line segment 56c and the first straight-line segment 56a and a curved corner segment 55 between a second straight-line segment 56d and the first straight-line segment 56a. And now, depiction regarding a step of forming a curved corner segment 55 between the second straight-line segment 56c and a first straight-line segment 56b and a curved corner segment 55 between the second straight-line segment 56d and the first straight-line segment 56b is omitted.

As depicted in FIG. 16, the coil forming step S110 includes a positioning step before pressing S111, a press work step S112, a positioning step before bending S114, a bend work step S115, a positioning step before bending S116, and a bend work step S117. And now, for convenience of description, up and down, front and back, and left and right directions are defined as depicted.

—Positioning Step Before Pressing—

As depicted in FIG. 16(a), in the positioning step before pressing S111, place a linear portion 61 of a conductor 60 (rectangular wire) between a die 70a and a die 70b. Put the linear portion 60 of the conductor 60 extending in front and back directions. Position the conductor so that both the left and right side surfaces of the rectangular conductor will face the pressing surfaces of the left and right dice 70a, 70b, respectively. And now, the conductor 60 is supported so that it is allowed to move forward by feeding equipment which is not depicted; the conductor is moved forward by driving the feeding equipment and the conductor 60 can be positioned into place by stopping the feeding equipment.

—Press Work Step—

As depicted in FIG. 16(b), in the press work step S112, place a linear portion 61 of a conductor 60 (rectangular wire) between a die 70a and a die 70b. Nip and press the left and right sides of the conductor 60 by the die 70a and the die 70b and plastically deform the conductor 60, thereby forming an incline segment 62. As depicted in FIG. 16(c), the incline segment 62 is formed such that its both ends are flexed (bent) in a left and right direction at a predetermined angle to the linear portion 61 so that the linear portion 61 following the incline segment will shift by one pitch, i.e., by a horizontal width dimension of the conductor 60 with respect to the linear portion 61 preceding the incline segment.

—Positioning Step Before Bending—

As depicted in FIG. 16(d), in the positioning step before bending S114, move the conductor 60 forward by a predetermined distance by the feeding equipment and position the conductor 60 so that a support rod 72 will be positioned around the forward end of the incline segment 62. The conductor 60 is put on the support rod 72 and a roller 71 is placed over the conductor 60. The support rod 72 and the roller 71 are placed such that their central axes extend in the left and right direction. The roller 71 is configured so that it can turn, centering on the support rod 72.

—Bend Work Step—

As depicted in FIG. 16(e), in the bend work step S115, move the roller 71 in such a manner as to loop the conductor 60 around the support rod 72. That is, in the bend work step S115, turn the roller 71 forward and downward, centering on the support rod 7, and press the roller 71 against the conductor 60 around the forward end of the incline segment 62. Turn the roller 71, taking an amount of spring back into account, and bend the conductor 60 downward over 90 degrees, thus forming a curved corner segment 55. This enables it to form a stator coil 5 without swelled winding. After bending the conductor 60, the roller 71 is turned in a reverse direction and returns to its home position.

—Positioning Step Before Bending—

As depicted in FIG. 16(f), in the positioning step before bending S116, move the conductor 60 forward by a predetermined distance by the feeding equipment and position the conductor 60 so that the support rod 72 will be positioned around the rear end of the incline segment 62.

—Bend Work Step—

As depicted in FIG. 16(g), in the bend work step S117, move the roller 71 in such a manner as to loop the conductor 60 around the support rod 72. That is, in the bend work step S117, turn the roller 71 forward and downward, centering on the support rod 72, and press the roller 71 against the conductor 60 around the rear end of the incline segment 62. As is the case for the bend word step S115, turn the roller 71, taking an amount of spring back into account, and bend the conductor 60 downward over 90 degrees, thus forming a curved corner segment 55 (see FIG. 16(h)). After bending the conductor 60, the roller 71 is turned in a reverse direction and returns to its home position.

And now, although not depicted, a curved corner segment 55 between the second straight-line segment 56c and the first straight-line segment 56b and a curved corner segment 55 between the second straight-line segment 56d and the first straight-line segment 56b are each formed by positioning the conductor 60 by the feeding equipment and performing bending work by the roller 71 that turns, centering on the support rod 72 in the coil forming step S110. Positioning by the feeding equipment before bending work is performed so that the first straight-line segments 56a, 56b will become shorter than the second straight-line segments 56c, 56d.

The coil forming step S110 is performed repeatedly, a winding part 50 that is made by being wound a plurality of times is formed, and connection terminals 52, 53 are formed at both ends of the winding part 50 by a bend work step which is not depicted.

As above, by bending the conductor around the forward end and around the rear end of an incline segment 62 formed beforehand, respectively, in a direction (downward) perpendicular to the direction (left and right direction) in which both the ends of the incline segment 62 are bent, it is possible to form a stator coil in which a part of a layer transition segment 54 (incline segment 62) is made by a part of a curved corner segment 55, as described previously.

According to the first embodiment described above, positive effects set forth below are obtained.

(1) A stator coil 5 pertaining to the present embodiment is the stator coil that is wound by concentrated winding and installed in a slot 40 of the stator 1. The stator coil 5 includes a winding part 50 in which a conductor 60 is wound pitch by pitch around a tooth 41 of the stator 1 and connection terminals 52, 53 which extend from both ends of the winding part 50. The winding part 50 includes a plurality of unit winding subparts 51 of a rectangular annular shape. Each unit winding subpart 51 includes a pair of first straight-line segments 56a, 56b, a pair of second straight-line segments 56c, 56d, and curved corner segments 55 which join the first straight-line segments 56a, 56b and the second straight-line segments 56c, 56d. In one of the pair of first straight-line segments 56a, 56b, i.e., a first straight-line segment 56a adjacent to the positions where the connection terminals 52, 53 are placed, layer transition segments 54 (incline segments 62) where the conductor 60 is shifted by one pitch toward the winding axis X direction are formed. In each unit winding subpart 51, a part of a layer transition segment 54 is made by a part of a curved corner segment 55.

Thereby, a dimension of a winding part 50 in a tooth width direction can be decreased and, therefore, it is feasible to downsize the stator coils 5, stator 1, and rotating electric machine 100, as compared with those available heretofore.

Because layer transition can be implemented using not only the first straight-line segment 56a but also a curved corner segment 55, it is enabled to make a layer transition, even if, with respect to the width dimension of a tooth 41 (hereinafter referred to as a tooth width WT), a width dimension of the conductor 60 (hereinafter referred to as a conductor width WC) perpendicular to the tooth width direction is large (e.g., WT:WC=about 4:1). Because the conductor 60 with a large conductor width WC with respect to the tooth width WT can be adopted, it is feasible to improve the efficiency of the rotating electric machine 100.

(2) In the stator coil 5, the first straight-line segments 56a, 56b are made shorter than the second straight-line segments 56c, 56d. That is, the layer transition segments 54 are formed in a short first straight-line segment 56a which is placed outside the slot 40, but not in the long second straight-line segment 56c, 56d which are placed within the slot 40. It is, therefore, not necessary to make the shape of the slot 40 large for layer transition. Consequently, it is feasible to downsize the stator 1.

(3) A method of manufacturing a stator coil 5 includes, when forming a winding part 50, a step of forming a plurality of unit winding subparts 51 having a rectangular annular shape with a pair of first straight-line segments 56a, 56b, a pair of second straight-line segments 56c, 56d, and curved corner segments 55 which join the first straight-line segments 56a, 56b and the second straight-line segments 56c, 56d. When forming a unit winding subpart 51, the method includes bending a linear portion 61 of a conductor by pressing with dice 70a, 70b, thus forming layer transition segments 54 (incline segments 62) where the conductor 60 is shifted by one pitch toward the winding axis X direction. Subsequently, the method further includes bending the conductor 60 around both ends of each of the layer transition segments 54 in a direction perpendicular to an imaginary plane on which the layer transition segments 54 lie, thus forming curved corner segments 55, so that a part of each of the layer transition segments 54 is made by a part of each of the curved corner segments 55 and the layer transition segments 54 are positioned in one first straight-line segment 56a of the pair of first straight-line segments 56a, 56b.

The manufacturing method as above enables aligning winding turns of the conductors 60 inside a slot 40, as depicted in FIG. 13. That is, the second straight-line segment 56c and the second straight-line segment 56d comprised in each unit winding subpart 51 can be placed facing each other across a tooth 41 and one lateral face of the conductor 60 can be brought in close contact with a tooth 41 with an insulator 20 intervening therebetween. In consequence, heat generated in the conductor 60 is transmitted efficiently to the stator core 4 and the rotating electric machine 100 having good heat dissipation performance can be provided. Improvement in heat dissipation performance decreases electric resistivity and leads to improvement in motor efficiency.

Figure 17:
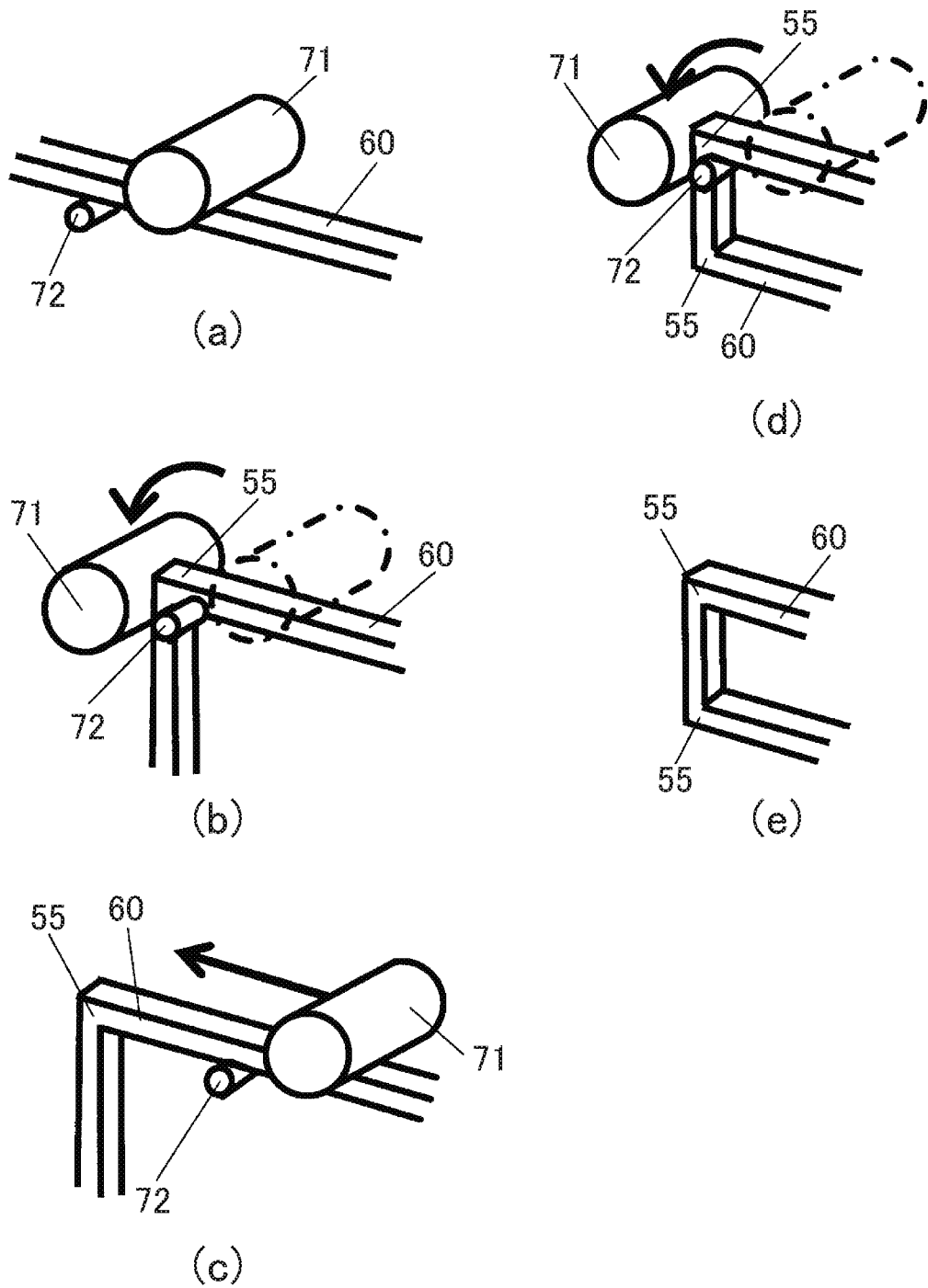
FIG. 17 is a diagram to explain a process of manufacturing an intermediate product of a stator coil pertaining to a comparison example.
Figure 18:
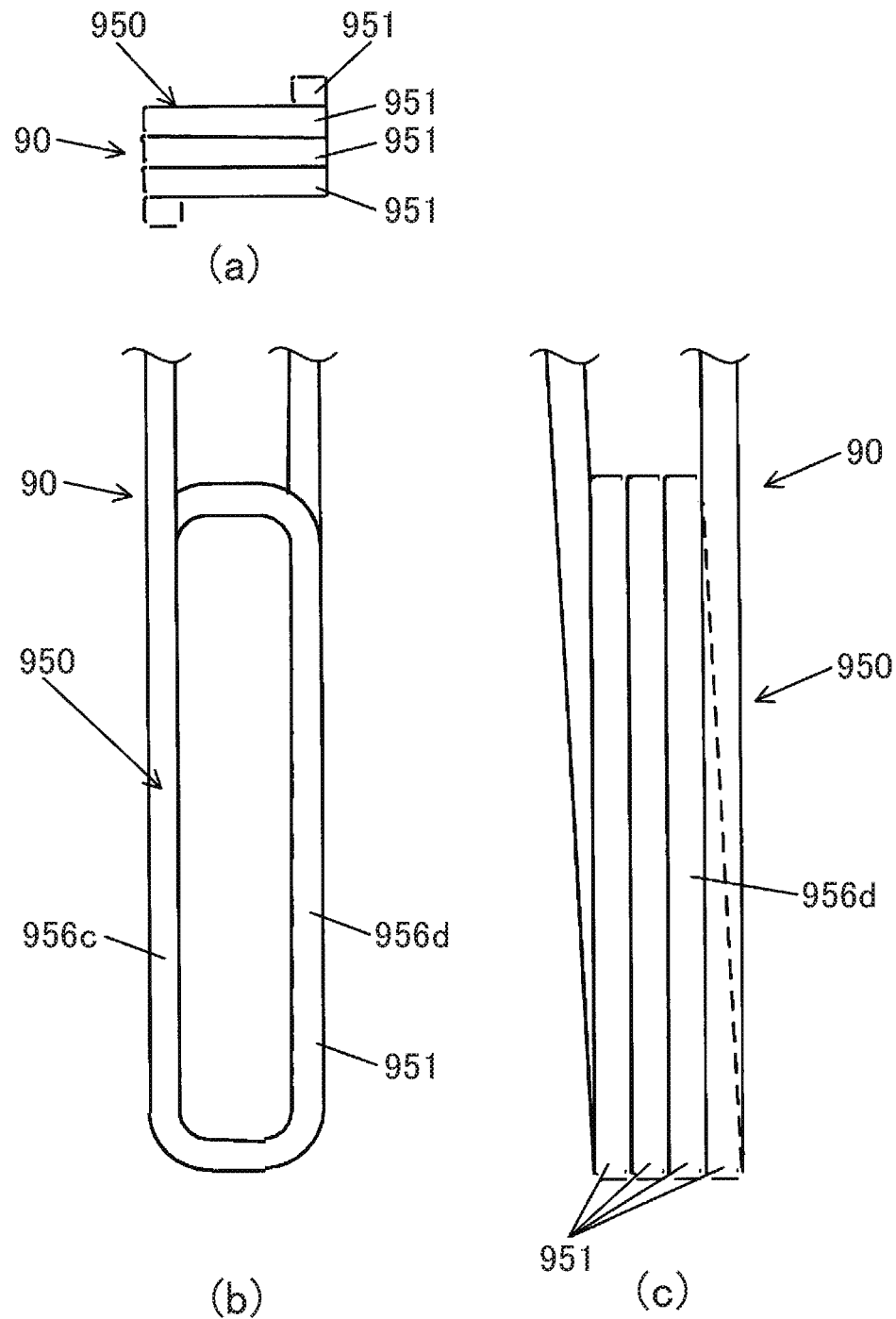
FIG. 18 is a diagram depicting the intermediate product of the stator coil pertaining to the comparison example.

Based on comparison with an example of a stator coil 905 (hereinafter referred to as a comparison example) which was formed by another manufacturing method than the manufacturing method depicted in FIG. 1, a detailed description is provided below about the positive effect (3) in which the conductor 60 can be brought in close contact with a tooth 41 by using the manufacturing method of the present embodiment FIG. 17 is a diagram to explain a process of manufacturing an intermediate product 90 (see FIG. 18) of a stator coil 905 pertaining to the comparison example. FIG. 18 is a diagram depicting the intermediate product 90 of the stator coil pertaining to the comparison example. A coil forming step in the comparison example forms a plurality of unit winding subparts 951 of a rectangular annular shape by performing bending work repeatedly and, then, forms layer transition segments 954 (see FIG. 20) by performing press working on second straight-line segments 956c, 956d having a multiple layer structure, as will be described later.

As depicted in FIG. 17, in the comparison example, position the conductor 60 (see FIG. 17(a)) and perform bending work with a roller 71, thus forming a curved corner segment 55 (see FIG. 17(b)). After that, move the conductor 60 forward by a predetermined distance by feeding equipment, position the conductor (see FIG. 17(c)), and perform bending work with the roller 71, thus forming a curved corner segment 55 (see FIG. 17(d), FIG. 17 (e)). In the comparison example, by repeatedly performing positioning by the feeding equipment and bending work with the roller 71, the intermediate product 90 which is depicted in FIG. 18 is formed. And now, the conductor 60 is wounded through bending work so that it will be gradually displaced by one pitch for one turn, that is, the conductor 60 will be gradually displaced toward the winding axis direction by the width dimension of the rectangular conductor 60, while it is wound by one turn; thus, a winding part 950 which is wound in a helical manner is formed.

FIG. 18(a) is a top view of the intermediate product 90, FIG. 18(b) is a font view of the intermediate product 90, and FIG. 18(c) is a side view of the intermediate product 90. As depicted in FIG. 18, as the intermediate product 90, the helically wound winding part 950 is formed in which the conductor 60 is shifted bit by bit toward the winding axis direction.

Figure 19:
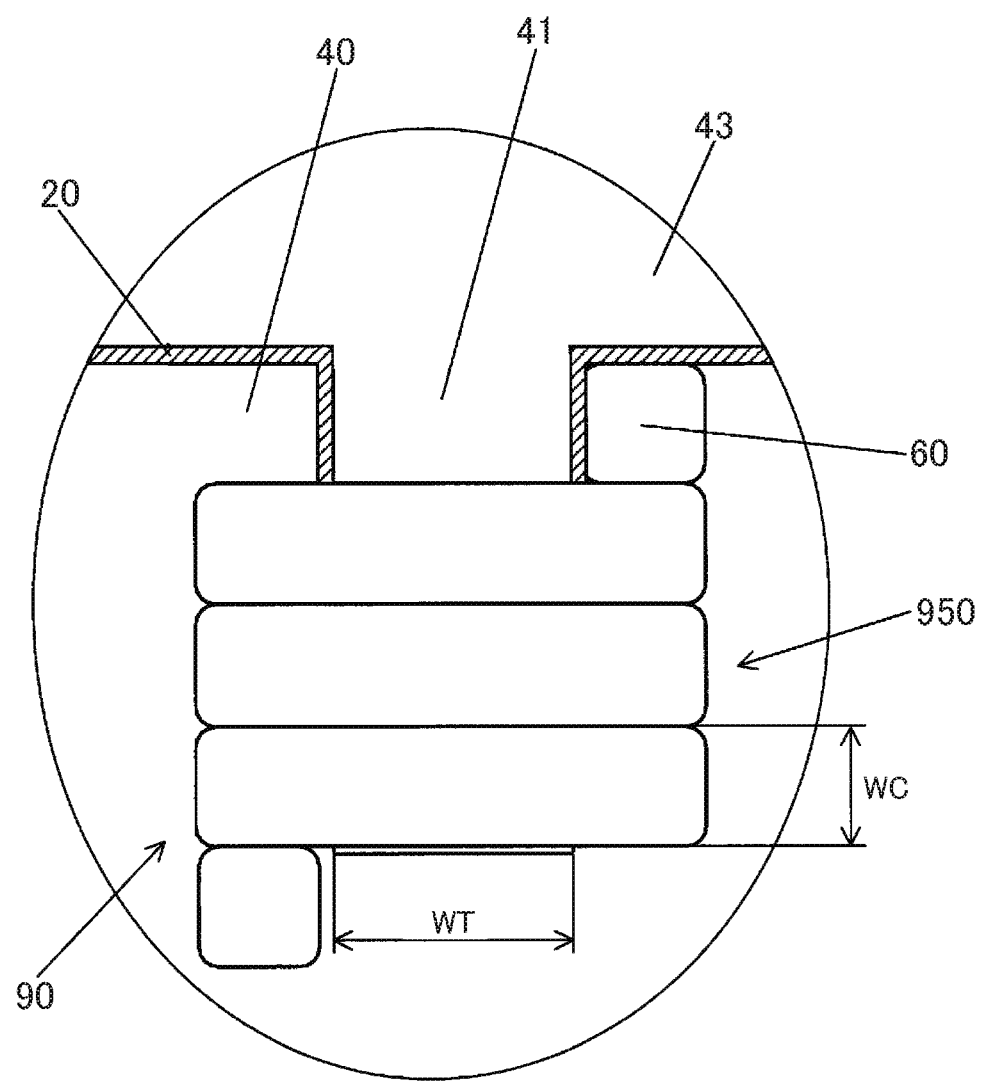
FIG. 19 is a diagram depicting a state in which the intermediate product is installed around a tooth.

FIG. 19 is a diagram depicting a state in which the intermediate product 90 is installed around a tooth 41. As depicted in FIG. 19, if the intermediate product 90 is installed around a teeth 41 as a finished product, one end of the conductor 60 runs off the edge of the tooth 41, assuming that the same tooth width WT and the same conductor width WC as for the present embodiment apply. Further, because the contact area between the core back 43 and the conductor 60 with the insulator 20 intervening therebetween decreases, heat dissipation performance is liable to decrease.

Figure 20:
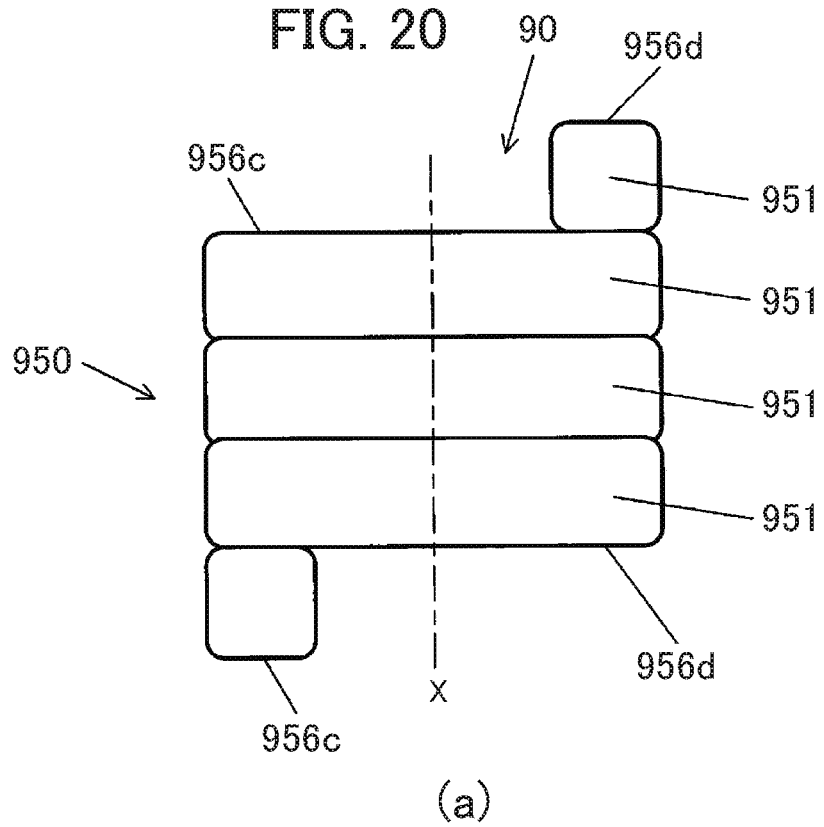
FIG. 20 is a diagram schematically depicting an aspect of forming layer transition segments by press working on the intermediate product.
Figure 20:
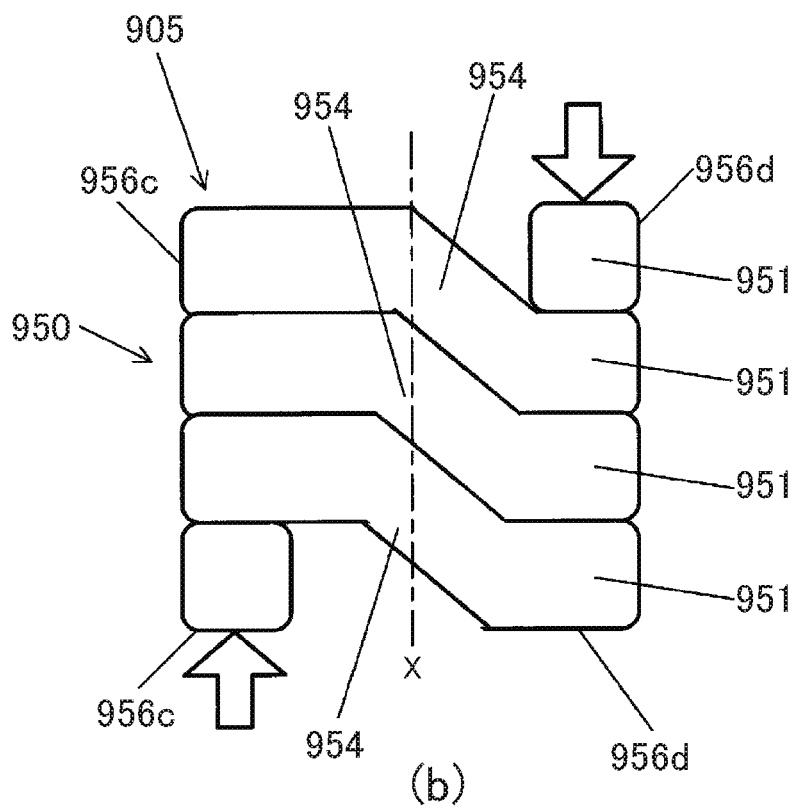

Accordingly, layer transition segments 954 are formed by performing press working on the intermediate product 90. FIG. 20 is a diagram schematically depicting an aspect of forming layer transition segments 954 by press working on the intermediate product 90. FIG. 20(a) is a schematic top view of the intermediate product 90 before layer transition segments 954 are formed, and FIG. 20 (b) is a schematic top view of the stator coil 905 in which layer transition segments were formed.

As depicted in FIG. 20(a), because the conductor is wound in a helical manner in the intermediate product 90, a pair of second straight-line segments 956c, 956d comprised in one unit winding subpart 951 are not placed facing each other across the winding axis X. In other words, the second straight-line segment 956c and the second straight-line segment 956d of each unit winding subpart 951 are not placed so as to be positioned at the same distance from the central axis of the stator core 4.

As indicated by arrow outlines in FIG. 20(b), press two long parallel sides of conductor winding turns of the winding part 950 (i.e., a stack of second straight-line segments 956c and a stack of second straight-line segments 956d) along the winding axis X direction and toward the center of the winding part 950. Thus, the layer transition segments 954 can be formed. Even by the manufacturing method as above, it is possible to form the stator coil 905 in which a part of a layer transition segment 954 is made by a part of curved corner segments 55. Further, because a dimension in the winding axis X direction can be reduced, it is possible to house the stator coil 905 within a slot 40. Therefore, the same positive effects as the positive effects (1) and (2) of the foregoing embodiment are produced even in the comparison example.

Figure 21:
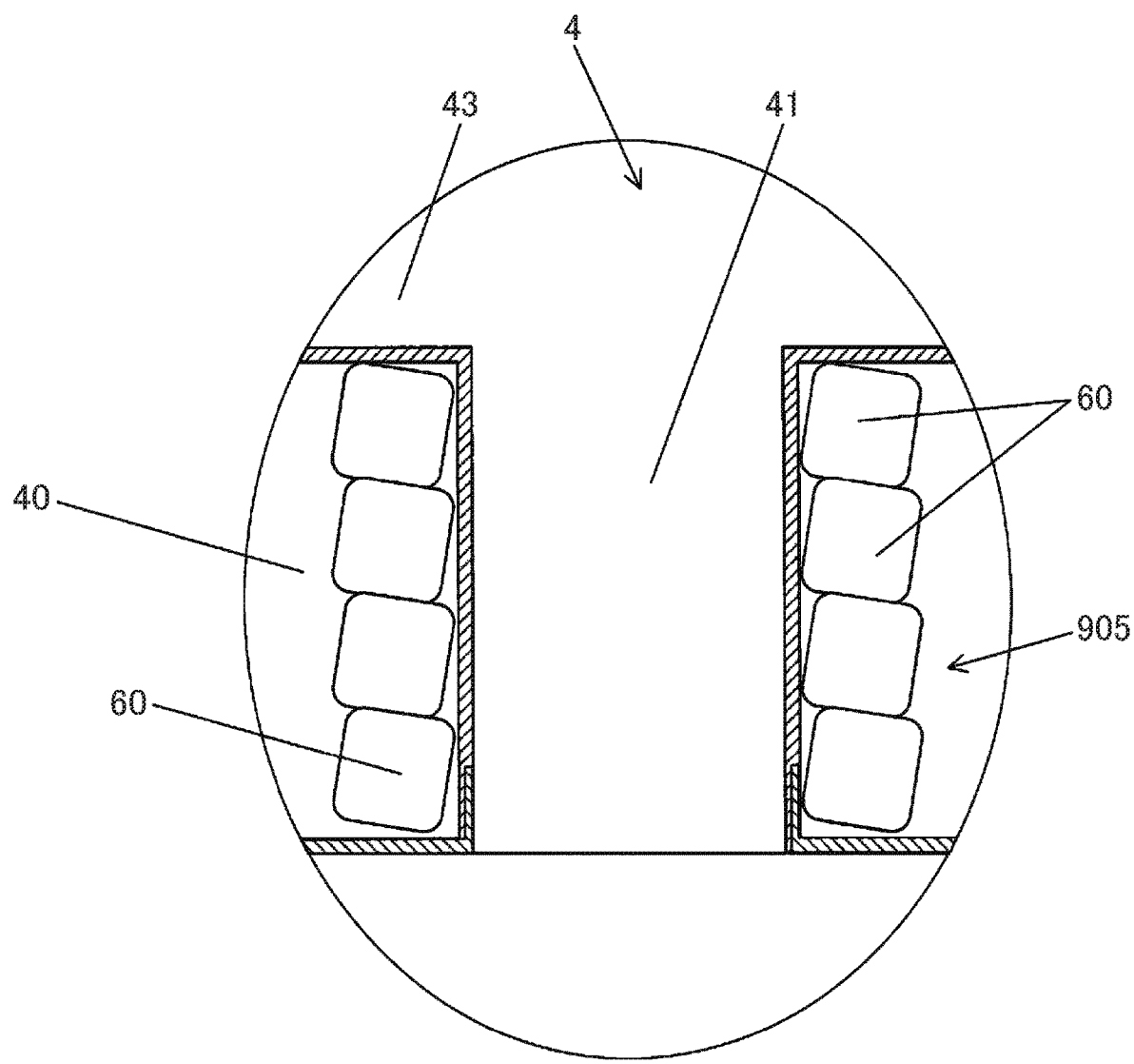
FIG. 21 is a partially enlarged schematic representation depicting a stator coil which is wound around one tooth in the comparison example.

However, in the stator coil 905 produced by the manufacturing method as above, the winding turns of the conductor 60 making the second straight-line segments 956c, 956d are skewed with respect to the lateral faces of a tooth 41, as depicted in FIG. 21, one lateral face of the conductor 60 tilts, and contact between the conductor 60 and the tooth 41 is liable to deteriorate. That is, in the comparison example, heat dissipation performance is liable to decrease.

In contrast, the stator coil 5 produced through the coil forming step depicted in FIG. 16 is favorable, since one lateral side of the conductor can be brought in good contact with the lateral faces of a tooth 41 with the covering part 20a of an insulator 20 intervening therebetween, as depicted in FIG. 13.

Modifications as set forth below fall within the range of the present invention and one or a plurality of modification examples can be combined with the foregoing embodiment.

MODIFICATION EXAMPLE 1

Although, in the foregoing embodiment, descriptions have been provided about the rotating electric machine 100 as one example of an electromagnetic device, the present invention is not limited to this. The present invention is also applicable to electromagnetic devices such as a direct acting type electric motor (linear motor) equipped with a stator extending linearly and a mover moving in a linear direction. That is, the electromagnetic devices include a rotary type electric motor, a direct acting type electric motor, a generator, and a generator-motor. And now, a stator core of a direct acting type corresponds to one that is formed by cutting out and spreading out the hollow cylindrical (annular) stator core 4 depicted in FIG. 6.

MODIFICATION EXAMPLE 2

Although, in the foregoing embodiment, descriptions have been provided about an example in which a conductor (rectangular wire) having a rectangular cross section is used, the present invention is not limited to this. Even in a case where a stator coil 5 is formed using a conductor (round wire) having a circular cross section, it is feasible to downsize the stator coil 5. And now, use of a rectangular wire is favorable, since this enables it to increase a ratio of the cross-sectional area of the conductor 60 to the cross-sectional area of a slot 40 (i.e., a lamination factor of the conductor 60) and enables it to decrease the copper loss of the rotating electric machine 100. That is, by using a rectangular wire, it is feasible to downsize the rotating electric machine 100 and increase its efficiency.

MODIFICATION EXAMPLE 3

Although, in the foregoing embodiment, descriptions have been provided about an inner rotor type rotating electric machine 100 in which the rotor 2 is disposed along the inner side of the stator 1 in a radial direction, the present invention may also be applied to an outer rotor type rotary electric motor in which the rotor 2 is disposed along the outer side of the stator 1 in a radial direction.

MODIFICATION EXAMPLE 4

Although, in the foregoing embodiment, descriptions have been provided about an example in which there is a single stratum of stator coils, the present invention is not limited to this. The present invention may also be applied to stator coils having a multi-stratum structure in a circumferential direction of the stator core 4.

Modification Example 5

Although, in the foregoing embodiment, descriptions have been provided about an example in which a stator coil is wound in four layers, the present invention is not limited to this. The coil may be wound in three or less layers or five or more layers.

MODIFICATION EXAMPLE 6

Although, in the foregoing embodiment, descriptions have been provided about an example in which layer transition segments 54 are provided in the first straight-line segment 56a adjacent to the positions where the stator coil's connection terminals 52, 53 are placed, the present invention is not limited to this. The layer transition segments 54 may be provided in the first straight-line segment 56b.

Modification Example 7

Although, in the foregoing embodiment, descriptions have been provided about an example in which a part of a curved corner segment 55 is formed in one end of an incline segment 62 (layer transition segment 54), whereas a part of a curved corner segment 55 is not formed in the other end thereof, the present invention is not limited to this. A part of a curved corner segment 55 may be formed in each of both ends of the layer transition segment 54. Further, it may be considered sufficient that, in at least one unit winding subpart 51, a part of an incline segment 62 (layer transition segment 54) is formed by apart of a curved corner segment 55.

The present invention is not limited to the foregoing embodiment and other embodiments that can be conceived within the range of a technical idea of the present invention are also included in the range of the present invention, unless impairing the features of the invention.

The disclosed contents of the following application on the basis of which the priority is claimed are incorporated herein as citations.

Japanese Patent Application No. 2014-140466 (filed on Jul. 8, 2014)

LIST OF REFERENCE SIGNS

1 Stator, 2 Rotor, 4 Stator core, 5 Stator coil, 8 Shaft, 9 Housing, 9a, 9b End Brackets, 9c Center bracket, 11 Bearing, 20 Insulator, 20a Covering part, 20b Flange part, 21 drop-off preventing piece, 21a Covering part, 21b Insertion part, 40 Slot, 41 Tooth, 43 Core back, 50 Winding part, 51 Unit winding subpart, 51a First winding subpart, 51b Second winding subpart, 51c Third winding subpart, 51d Fourth winding subpart, 52, 53 Connection terminals, 54 (54a, 54b, 54c) Layer transition segments, 55 Curved corner segment, 56a, 56b First straight-line segments, 56c, 56d Second straight-line segments, 57 Non-overlap region, 58 Overlap region, 59 Power supply connection terminal, 60 Conductor, 61 Linear portion, 62 Incline segment, 70a Die, 70b Die, 71 Roller, 72 Support rod, 90 Intermediate product, 100 Rotating electric machine, 905 Stator coil, 950 Winding part. 951 Unit winding subpart, 954 Layer transition segment, 956c, 956d Second straight-line segments

The invention claimed is:

1. A method of manufacturing a stator, the method comprising:

forming a stator coil including a winding part and first and second connection terminals which extend from first and second ends of the winding part, the winding part including a plurality of unit winding subparts each having a rectangular annular shape with a pair of first straight-line segments, a pair of second straight-line segments, and a plurality of curved corner segments which join the first straight-line segments and the second straight-line segments, wherein the forming of at least one of the unit winding subparts of the winding part of the stator coil includes:

bending a linear portion of a conductor by pressing with first and second die to form a layer transition segment, where the conductor is shifted by one pitch in a winding axis X direction, which corresponds to one of the pair of the first straight-line segments, and after the bending of the linear portion of the conductor by pressing with the first and second die to form the layer transition segment, bending the conductor around both ends of the layer transition segment to form two of the curved corner segments of the rectangular annular shape, and the layer transition segment connects to the two of the curved corner segments; and installing the stator coil on a single tooth between adjacent slots of a stator core,
wherein the unit winding subparts are wound pitch by pitch around the tooth with respect to the winding axis X direction, and
wherein the stator coil is a concentrated winding.

2. The method according to claim 1,
wherein the first straight-line segments are bent to be shorter than the second straight-line segments.

3. The method according to claim 1,
wherein the stator core is a hollow, cylindrical, iron stator core.

4. The method according to claim 3,
wherein the second straight-line segments are placed within the adjacent slots, and
wherein the first straight-line segments are placed outside the adjacent slots.

5. The method according to claim 3,
wherein the stator is provided with a mover movable with respect to the stator.

6. The method according to claim 1, wherein the bending of the linear portion of the conductor by pressing with the first and second die to form the layer transition segment includes:
feeding the linear portion of the conductor between the first and second die so that respective side surfaces of the linear portion of the conductor face respective pressing surfaces of the first and second die, and
pressing the respective side surfaces of the linear portion of the conductor face with the respective pressing surfaces of the first and second die to plastically deform both ends of the linear portion to form the layer transition segment and shift the conductor by the one pitch corresponding to a width dimension of the conductor, and
wherein the bending of the conductor around both ends of the layer transition segment to form two of the curved corner segments includes:
feeding to conductor to position a first end of the layer transition segment over a support rod,
positioning a roller over the conductor,
moving the roller to loop around the support rod while centered on the support rod and pressed against the conductor around the first end of the layer transition segment to bend the conductor over 90 degrees to form a first one of the curved corner segments,
reversing the movement of the roller to position the roller over the conductor,
feeding the conductor to position a second end of the layer transition segment over the support rod, and
moving the roller to loop around the support rod while centered on the support rod and pressed against the conductor around the second end of the layer transition segment to bend the conductor over 90 degrees to from a second one of the curved corner segments.

* * * * *